(12) United States Patent
Kadayam

(10) Patent No.: US 8,386,433 B1
(45) Date of Patent: Feb. 26, 2013

(54) COALESCING METADATA FOR MIRRORING TO A REMOTE NODE IN A CLUSTER STORAGE SYSTEM

(75) Inventor: Harihara S. Kadayam, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 415 days.

(21) Appl. No.: 12/709,190

(22) Filed: Feb. 19, 2010

(51) Int. Cl.
*G06F 7/00* (2006.01)

(52) U.S. Cl. .............................. 707/656; 707/646

(58) Field of Classification Search ............ 707/656, 707/646
See application file for complete search history.

(56) References Cited

U.S. PATENT DOCUMENTS

| | | | |
|---|---|---|---|
| 7,143,122 B2 * | 11/2006 | Burton et al. | 707/613 |
| 7,406,487 B1 * | 7/2008 | Gupta et al. | 1/1 |
| 7,676,514 B2 * | 3/2010 | Faibish et al. | 707/646 |
| 7,707,186 B2 * | 4/2010 | LeCrone et al. | 707/656 |
| 7,752,166 B2 * | 7/2010 | Quinlan et al. | 707/613 |
| 7,827,139 B2 * | 11/2010 | Schauser et al. | 707/613 |
| 8,018,720 B2 * | 9/2011 | Campbell et al. | 361/700 |
| 8,019,720 B2 | 9/2011 | Jasik | |
| 8,150,811 B1 | 4/2012 | Tarenskeen | |
| 2007/0033354 A1 | 2/2007 | Burrows | |
| 2010/0049930 A1 | 2/2010 | Pershin | |
| 2010/0145949 A1 * | 6/2010 | Arrouye et al. | 707/737 |
| 2010/0235326 A1 * | 9/2010 | Fashchik et al. | 707/656 |
| 2011/0153568 A1 * | 6/2011 | Shang et al. | 707/648 |

OTHER PUBLICATIONS

U.S. Appl. No. 12/709,185, filed Feb. 19, 2010, Kadayam, et al.
Office Action dated May 30, 2012 issued by the USPTO for U.S. Appl. No. 12/709,185.

* cited by examiner

*Primary Examiner* — Pierre Vital
*Assistant Examiner* — Christopher J Raab
(74) *Attorney, Agent, or Firm* — Stattler-Suh PC

(57) ABSTRACT

Described herein are a system and method for remote mirroring/copying data and metadata sets from a local node to a remote node that reduces the number of metadata sets that are mirrored. In some embodiments, the local node may coalesce metadata sets into metadata chains, each metadata chain comprising a grouping of two or more metadata sets. In some instances, a "representative" metadata set of a metadata chain may be selected for sending to the remote node for storing, wherein the other metadata sets of the metadata chain are not sent to the remote node. In these embodiments, the selected metadata set may represent all the metadata sets in the chain and be the only metadata set in the chain that is transmitted and stored to the remote node. As such, the network congestion between the local and remote nodes may be reduced.

10 Claims, 14 Drawing Sheets

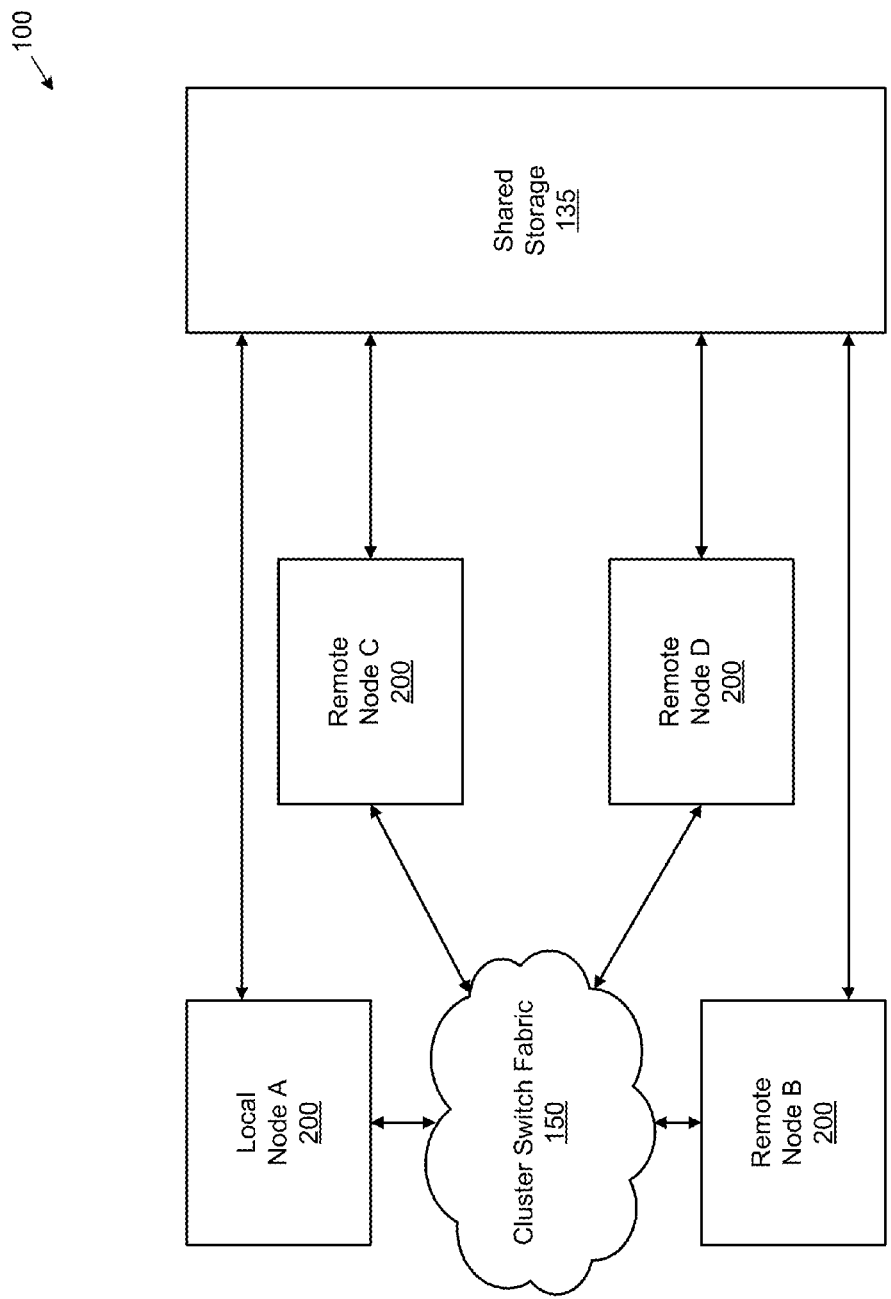

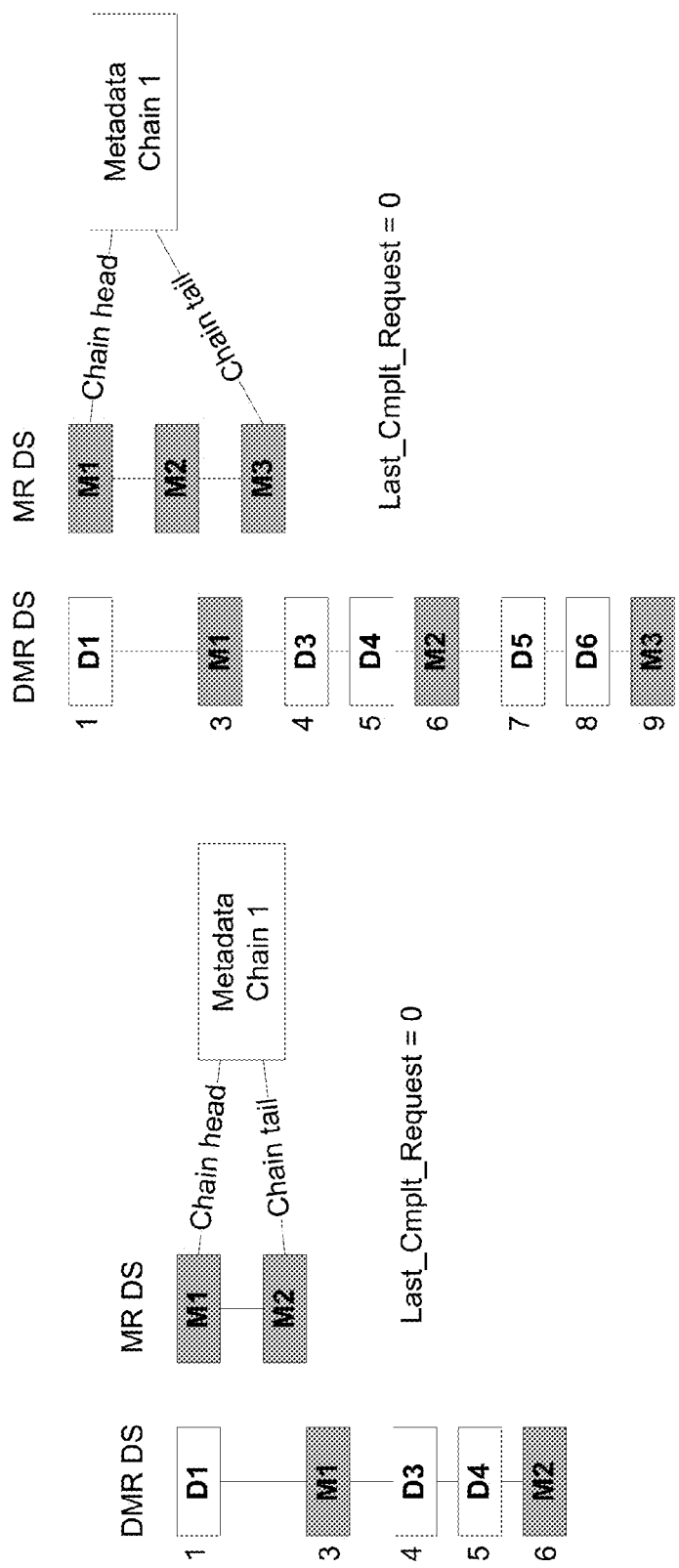

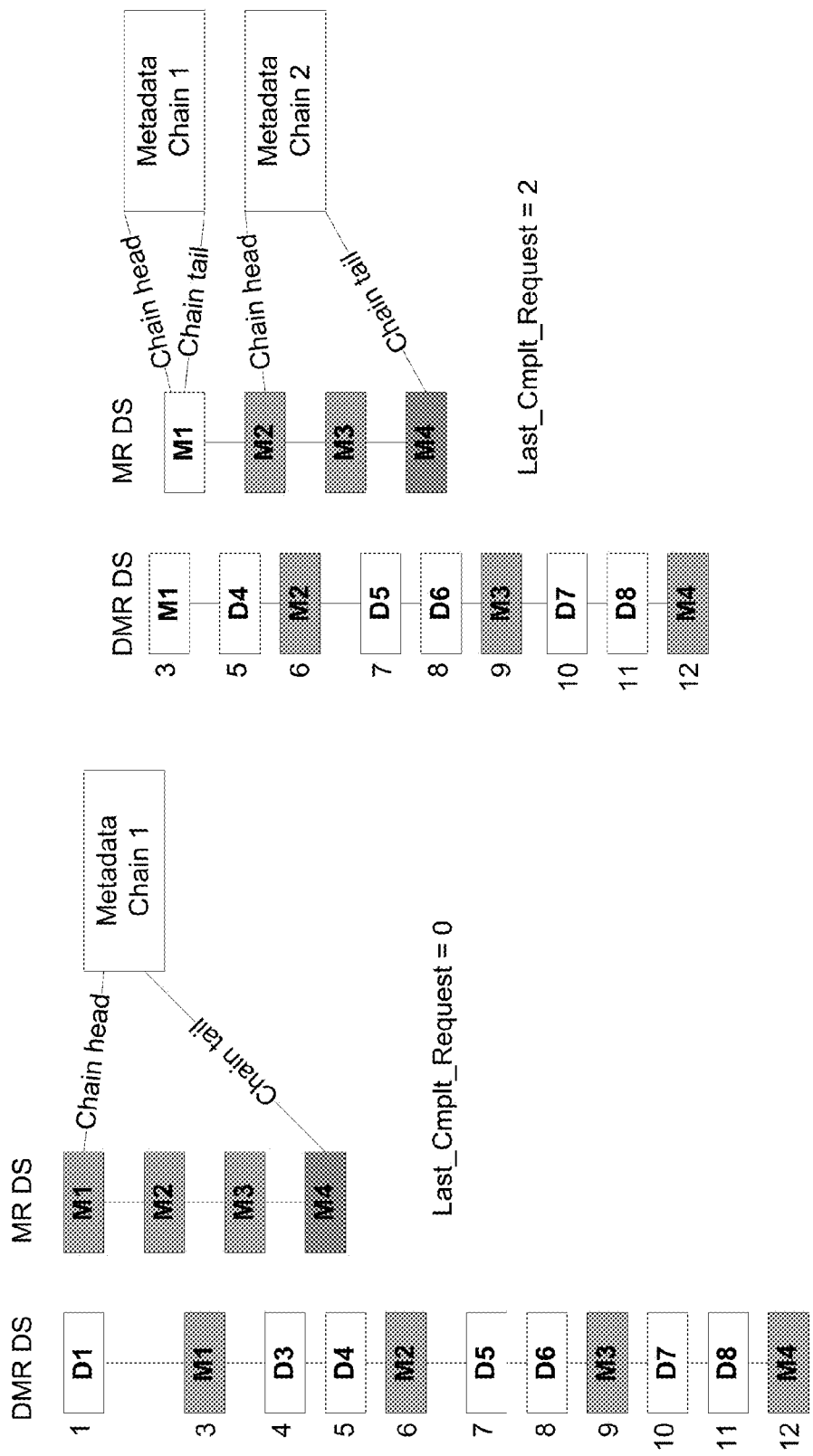

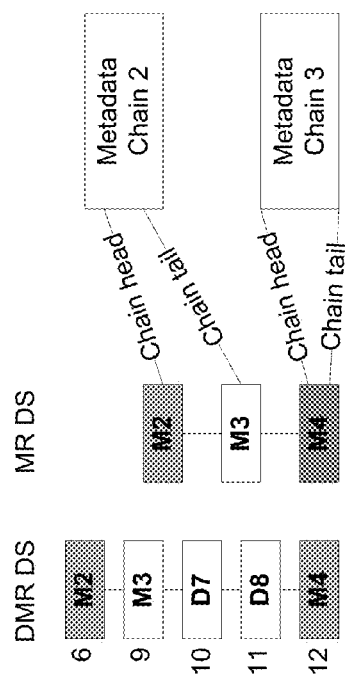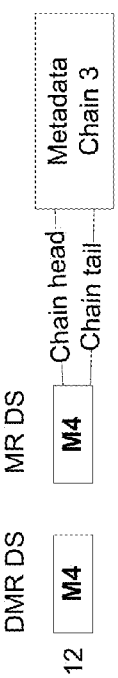
FIG. 9H
FIG. 9I

COALESCING METADATA FOR MIRRORING TO A REMOTE NODE IN A CLUSTER STORAGE SYSTEM

FIELD OF THE INVENTION

The present invention relates to storage systems, and particularly, to coalescing metadata for mirroring to a remote node in a cluster storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD). The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

A plurality of storage systems may be interconnected to provide a storage system architecture configured to service many clients. In some embodiments, the storage system architecture provides one or more aggregates and one or more volumes distributed across a plurality of nodes interconnected as a cluster. The aggregates may be configured to contain one or more volumes. The volumes may be configured to store content of data containers, such as files and logical units, served by the cluster in response to multi-protocol data access requests issued by clients.

Each node of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each node is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The nodes of the cluster may be configured to communicate with one another to act collectively to increase performance or to offset any single node failure within the cluster. Each node in the cluster may have a predetermined failover "partner" node that may take over/resume storage functions of the node upon failure of the node. When a node failure occurs (where the failed node is no longer capable of processing access requests for clients), the access requests sent to the failed node may be re-directed to the partner node for processing. As such, the cluster may be configured such that a partner node may take over the work load of a failed node. As used herein, a local/source node may have data and metadata that is mirrored/copied to a remote/destination node in the cluster storage system (as discussed below). The remote node may comprise a predetermined failover partner node of the local node. As used herein, various components residing on the local node may likewise be referred to as a local component (e.g., local memory, local de-staging layer, etc.) and various components residing on a remote node may likewise be referred to as a remote component (e.g., remote memory, remote de-staging layer, etc.).

A cluster provides data-access service to clients by providing access to shared storage (comprising a set of storage devices). Typically, clients will connect with a node of the cluster for data-access sessions with the node. During a data-access session with a node, a client may submit access requests (read/write requests) that are received and performed by the node. For the received write requests, the node may produce write logs that represent the write requests and locally store the write logs to a volatile storage device (from which, the node may at a later time perform the write logs on the storage devices).

To ensure data consistency and provide high data availability, the write logs may also be stored to two non-volatile storage devices. Typically, the write logs of the node may be locally stored to a non-volatile storage device and also be stored remotely to a non-volatile storage device at a partner node (sometimes referred to herein as mirroring data to a remote node). As such, if the local node fails, the remote partner node will have a copy of the write logs and will still be able to perform the write logs on the storage devices. Also, if the write logs stored at the partner node is corrupted or lost, the write logs stored locally in the non-volatile storage device at the local node can be extracted/retrieved and used to perform the write logs on the storage devices.

As such, data in a local non-volatile storage device at a local node may be mirrored to a remote non-volatile storage device of a remote node to provide failover protection (e.g., in case the local node crashes) and high availability of data in the cluster storage system. The mirrored data may comprise write logs, or any other data that is to be stored to the non-volatile storage devices.

Typically, for a group of related data sets (e.g., data sets X, Y), there may also be a metadata set (e.g., metadata set Z) that describes each of the related data sets (e.g., metadata set Z describes data sets X, Y), the metadata set to also be stored to the local and remote non-volatile storage devices. As used herein, a "related group" of data and metadata sets may comprise one or more data sets and one metadata set that describes and is associated with each of the one or more data sets. For example, the data sets of a related group may comprise data sets X, Y and metadata set Z, where metadata set Z specifies that there are 2 valid data sets. A "valid" data set may comprise user/client data that is pending to be stored to the local and remote non-volatile storage devices. The ratio of data sets to a metadata set produced may vary depending on the mirroring client. For example, a particular mirroring client may continually produce and send one metadata set for every two data sets, whereby each related group comprises two data sets and one metadata set.

Metadata sets may be produced at the local node to assist in the processing of the data sets, the metadata sets also being mirrored to the remote node. However, additional software and hardware resources are expended to process the metadata sets and the metadata sets cause additional network congestion between the local and remote nodes, consuming the network connection's valuable data bandwidth. Since metadata sets do not comprise user/client data, the metadata sets may be considered overhead that should be limited as much as possible.

SUMMARY OF THE INVENTION

Described herein are a system and method for remote mirroring/copying data and metadata sets from a local node to a remote node that reduces the number of metadata sets that are mirrored. In some embodiments, the local node may coalesce metadata sets into metadata chains, each metadata chain comprising a grouping of two or more metadata sets. In some instances, a "representative" metadata set of a metadata chain may be selected for sending to the remote node for storing, wherein the other metadata sets of the metadata chain are not sent to the remote node. In these embodiments, the selected metadata set may represent all the metadata sets in the chain and be the only metadata set in the chain that is transmitted and stored to the remote node. As such, the network congestion between the local and remote nodes may be reduced.

In some embodiments, the local/source node executes software layers or applications (referred to as "mirroring clients") that may require data and metadata to be stored to a local non-volatile storage device and mirrored/stored to a remote non-volatile storage device on the remote/destination node. In some embodiments, a mirroring client comprises a software layer (e.g., file system layer) of a storage operating system executing on the local node. For storing data and metadata to the local non-volatile storage device, a mirroring client may send the data and metadata to software layers of the storage operating system that store the data and metadata using methods known in the art. For storing data and metadata to the remote non-volatile storage device, each mirroring client may also send a stream of data and metadata to a mirroring layer/engine (sometimes referred to as an interconnect (IC) layer/engine) of the storage operating system that stores the data and metadata using methods described herein.

In some embodiments, the mirroring layer/engine may perform embodiments described herein. The mirroring layer may receive the stream of data and metadata from each mirroring client and store the received data and metadata to a remote node, while reducing the number of metadata sets transmitted and stored to the remote node. In some embodiments, the mirroring layer produces a data and metadata request (DMR) data structure and a metadata request (MR) data structure for each mirroring client. The mirroring layer may treat each received data and metadata set as a request (having a unique request identifier XID) from the mirroring client to mirror/store the data or metadata set to the remote node. In some embodiments herein, the terms data or metadata "set" may be used interchangeably with the terms data or metadata "request." The mirroring layer may queue/store each received data and metadata set/request to the DMR data structure for the mirroring client. The mirroring layer may also queue/store each received metadata set/request to the MR data structure for the mirroring client.

In some embodiments, the metadata sets produced by a mirroring client may specify the total accumulated number of data sets currently produced by the mirroring client and sent to the mirroring layer. Because of the accumulative nature of the metadata sets, the data contained in a new metadata set may encompass or encapsulate data contained in a previous metadata set. In certain circumstances, only sending a new metadata set to the remote node may produce the same end result as sending the previous metadata set and then the new metadata set.

The mirroring layer may queue/store received requests to the DMR and MR data structures based on the time order the requests are received. For example, earlier received requests may be stored towards the top of the DMR and MR data structures and later received requests may be stored towards the bottom of the DMR and MR data structures. As such, a new metadata request stored below a previous metadata request may encompass or encapsulate the data contained in the previous metadata set. As data and metadata requests are completed (i.e., successfully stored to the remote node), the mirroring layer may remove completed requests from the DMR and MR data structures.

In some embodiments, the mirroring layer may use the MR data structure to manage metadata chains (e.g., produce, break, and/or delete metadata chains). As used herein, each metadata chain may comprise a head metadata request, a tail metadata request, and zero or more middle metadata requests. The head metadata request may comprise a metadata request that is received earlier than the tail metadata request and is stored above the tail metadata request in the DMR and MR data structures.

In some embodiments, the mirroring layer may coalesce a newly received metadata request with a previously received metadata request in the MR data structure to produce a chain if certain conditions exist. For example, the metadata requests may be coalesced if both metadata requests are to be stored to the same storage address location at the remote non-volatile storage device 230 at the remote node, both metadata requests have the same data size, or the previous metadata request has not yet been transmitted to the remote node. In other embodiments, the mirroring layer may require all three conditions, or any combination of the three conditions, for coalescing the two metadata requests to produce a chain.

As used herein, a "representative" metadata request comprises a metadata request in a metadata chain that is the only metadata request in the chain that is sent to the remote node. A "represented" metadata request may comprise the other metadata requests in the metadata chain that are not sent to the remote node. In some embodiments, the mirroring layer may send, to the remote node, only the representative metadata request in a metadata chain (and not send represented metadata requests to the remote node) only in certain circumstances.

In some embodiments, only the representative metadata request in a chain is sent when the metadata requests in the chain comprise the top-most requests currently stored in the DMR data structure (i.e., the metadata requests in the chain comprise the most earliest received requests currently remaining/stored in the DMR data structure) and the representative metadata request comprises the tail metadata request in the chain. For example, if the chain comprises two metadata requests, only the representative metadata request in the chain is sent if the two metadata requests in the chain comprise the top two requests in the DMR data structure, and the representative metadata request comprises the tail metadata request that is received after the represented metadata request that comprises the head metadata request in the chain. As such, the representative metadata request is the last received metadata request in the chain and may encompass or encapsulate data contained in the represented metadata request.

BRIEF DESCRIPTION OF THE DRAWINGS

FIGS. 1A-B are schematic block diagrams of an exemplary cluster environment in which some embodiments operate;

FIGS. 9A-I conceptually illustrate processes of the methods of FIGS. 5, 6, and 7.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a cluster environment in which some embodiments operate. Section II describes a storage operating system having a mirroring layer for remote mirroring of data and metadata to a remote node. Section III describes a method and apparatus for reducing metadata in remote mirroring of data and metadata to a remote node.

I. Cluster Environment

Figure 1A:
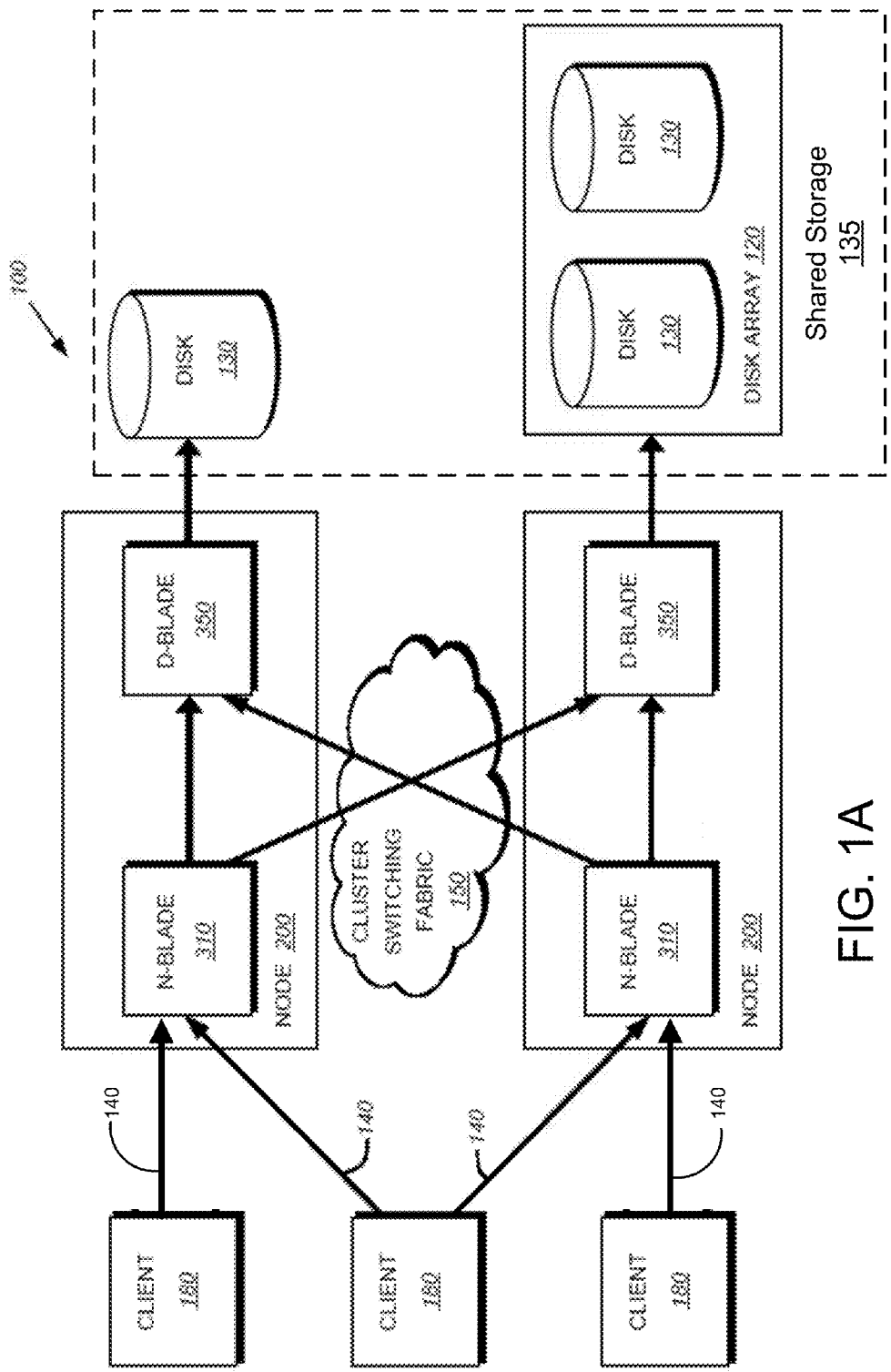

FIGS. 1A-B are schematic block diagrams of an exemplary cluster 100 environment in which some embodiments operate. A cluster 100 may comprise a plurality of interconnected nodes 200 configured to provide storage services for a set of storage devices. The nodes 200 comprise various functional components that cooperate to provide a distributed storage system architecture of the cluster 100.

As shown in FIG. 1A, each node 200 may be organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a connection system, such as a cluster switching fabric 150 (discussed below).

It should be noted that although disks 130 are used in some embodiments described below, any other type of storage device may be used as well. For example, a solid state storage device may be used instead, the solid state device having no mechanical moving parts for reading and writing data. Some examples of solid state devices include flash memory, non-volatile storage device (NVRAM), Magnetic Random Access Memory (MRAM), Phase Change RAM (PRAM), etc. In other embodiments, other storage devices other than those mentioned here may also be used.

Also, it should be noted that while there is shown an equal number of N and D-blades in the illustrative cluster 100, there may be differing numbers of N and/or D-blades, and/or different types of blades implemented in the cluster 100 in accordance with various embodiments. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only. For example, a node 200 may also have one N-blade and a plurality of D-blades, a plurality of N-blades and one D-blade, or a plurality of N-blades and a plurality of D-blades.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session with the node 200. During a data-access session, the client 180 may submit access requests that are received and performed by the node 200. Such access requests may include storage state requests, a storage state request comprising a request that alters the data state of a storage device 130. Examples of storage state requests include requests for storing new data to a file, deleting a file, changing attributes of a file, etc. For illustrative purposes, storage state requests may be generically referred to herein as write requests.

In some embodiments, the totality of storage space provided by the disks 130 and disk arrays 120 of the cluster 100 comprise a total shared storage space (referred to as "shared storage 135") of the cluster 100. In other embodiments, the shared storage 135 comprises the totality of storage space provided by other types of storage devices (such as solid state storage devices). The shared storage 135 is accessible by each D-blade 350 of each node 200 in the cluster 100. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100.

FIG. 1B shows an embodiment where each node 200 may have one or more predetermined failover "partner" nodes 200. Each node is configured for providing data-access service to clients connected with the node. When a node 200 failure occurs (where the failed node is no longer capable of processing access requests for clients 180), the one or more partner nodes 200 are configured to automatically resume/take over the data-access service functions provided by the failed node 200. As such, when a node failure occurs, access requests sent to the failed node 200 may be re-directed to the one or more partner nodes 200 for processing and execution. Note that a node 200 failure may occur unintentionally or intentionally (e.g., where a node is taken offline for servicing).

To ensure data consistency and provide high data availability, a local/source node (e.g., local node A) may have data and metadata stored to a local non-volatile storage device that is mirrored/copied to a remote non-volatile storage device at a remote/destination node (e.g., remote node B) in the cluster 100. Likewise, remote node B may have data and metadata stored to the remote non-volatile storage device that is mirrored/copied to a local non-volatile storage device at the local node A. The remote node B may comprise a predetermined failover partner node of the local node A. Likewise, the local node A may comprise a predetermined failover partner node of the remote node B. As used herein, various software and hardware components residing on the local node may be referred to as a "local" component (e.g., local non-volatile storage device, local de-staging layer, etc.) and various components residing on a remote node may be referred to as a "remote" component (e.g., remote non-volatile storage device, remote de-staging layer, etc.).

The data and metadata mirrored from the local node A to remote node B may comprise, for example, write logs. As such, if the local node A fails, the remote partner node B will have a copy of the write logs and will still be able to perform the write logs on the storage devices. In other embodiments, the data and metadata mirrored from the local node A to remote node B may comprise any other type of data and metadata. As such, data in a local non-volatile storage device at a local node may be mirrored to a remote non-volatile storage device of a remote node to provide failover protection (e.g., in case the local node crashes) and high availability of data in the cluster storage system.

Figure 2:
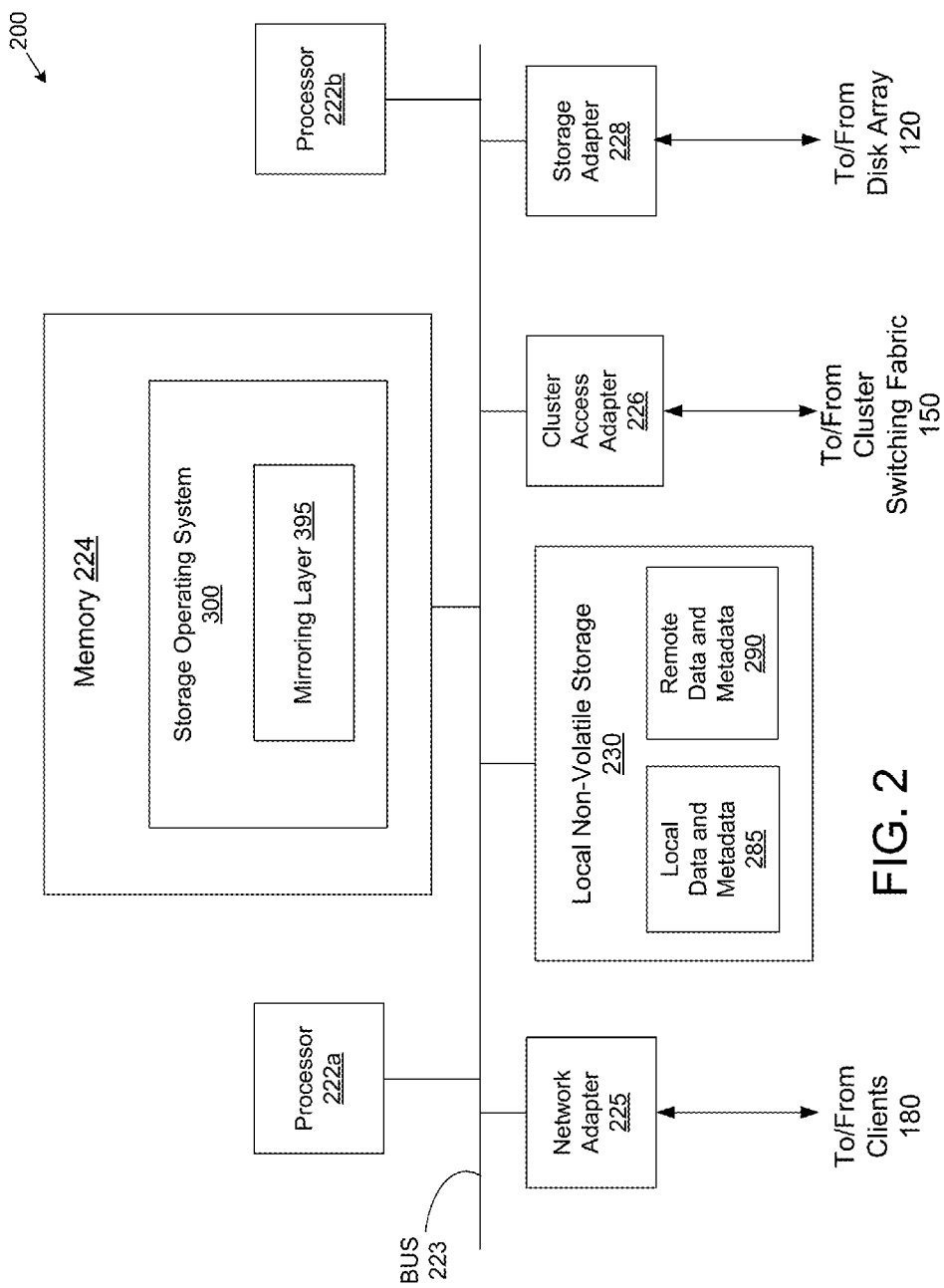
FIG. 2 is a schematic block diagram of an exemplary node that may be employed in the cluster environment.

FIG. 2 is a schematic block diagram of an exemplary node 200 that may be employed in the cluster environment of FIGS. 1A-B. A node 200 may be illustratively embodied as a storage system comprising a plurality of processors 222a,b, a memory 224, a network adapter 225, a cluster access adapter 226, a storage adapter 228 and local non-volatile storage device 230 interconnected by a system bus 223.

The cluster access adapter 226 comprises a plurality of ports adapted to couple the node 200 to other nodes of the cluster 100 through the cluster switching fabric 150. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224. In some embodiments, the memory 224 may comprise a form of random access memory (RAM) comprising "volatile" memory that is generally cleared by a power cycle or other reboot operation.

The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to the invention described herein. In some embodiments, the storage operating system 300 comprises a plurality of software layers (including a mirroring layer/engine 395) that are executed by the processors.

The local non-volatile storage device 230 may comprise one or more storage devices utilized by the node to locally store data. The local non-volatile storage device 230 may be employed as a backup memory that ensures that the storage system does not "lose" received information, e.g., CIFS and NFS requests, in the event of a system shutdown or other unforeseen problem. In some embodiments, the non-volatile storage device 230 may comprise a rewritable computer memory for storing data that does not require power to maintain data/information stored in the computer memory and may be electrically erased and reprogrammed. Some examples of non-volatile storage devices include disks, flash memory, non-volatile storage device (NVRAM), Magnetic Random Access Memory (MRAM), Phase Change RAM (PRAM), etc. In other embodiments, other non-volatile storage devices are used other than those listed here.

In some embodiments, the local non-volatile storage device 230 may locally store various data and metadata from software layers or applications (referred to as "mirroring clients") executing on the node. For example, a mirroring client may comprise a software layer (e.g., file system layer or RAID layer) of a storage operating system executing on the node. In other embodiments, the mirroring client may comprise any other software layer or application that requests data and metadata to be stored to the local non-volatile storage device 230 and mirrored/stored to a remote non-volatile storage device 230 on a remote node. For storing data and metadata to the local non-volatile storage device 230, a mirroring client may send the data and metadata to software layers of the storage operating system that store the data and metadata using methods known in the art. For storing data and metadata to the remote non-volatile storage device 230, each mirroring client may also send a stream of data and metadata to the mirroring layer/engine 395 (sometimes referred to as an interconnect (IC) layer/engine) that mirrors/stores the data and metadata to the remote node using methods described herein.

II. Storage Operating System Having a Mirroring Layer
A. Storage Operating System To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
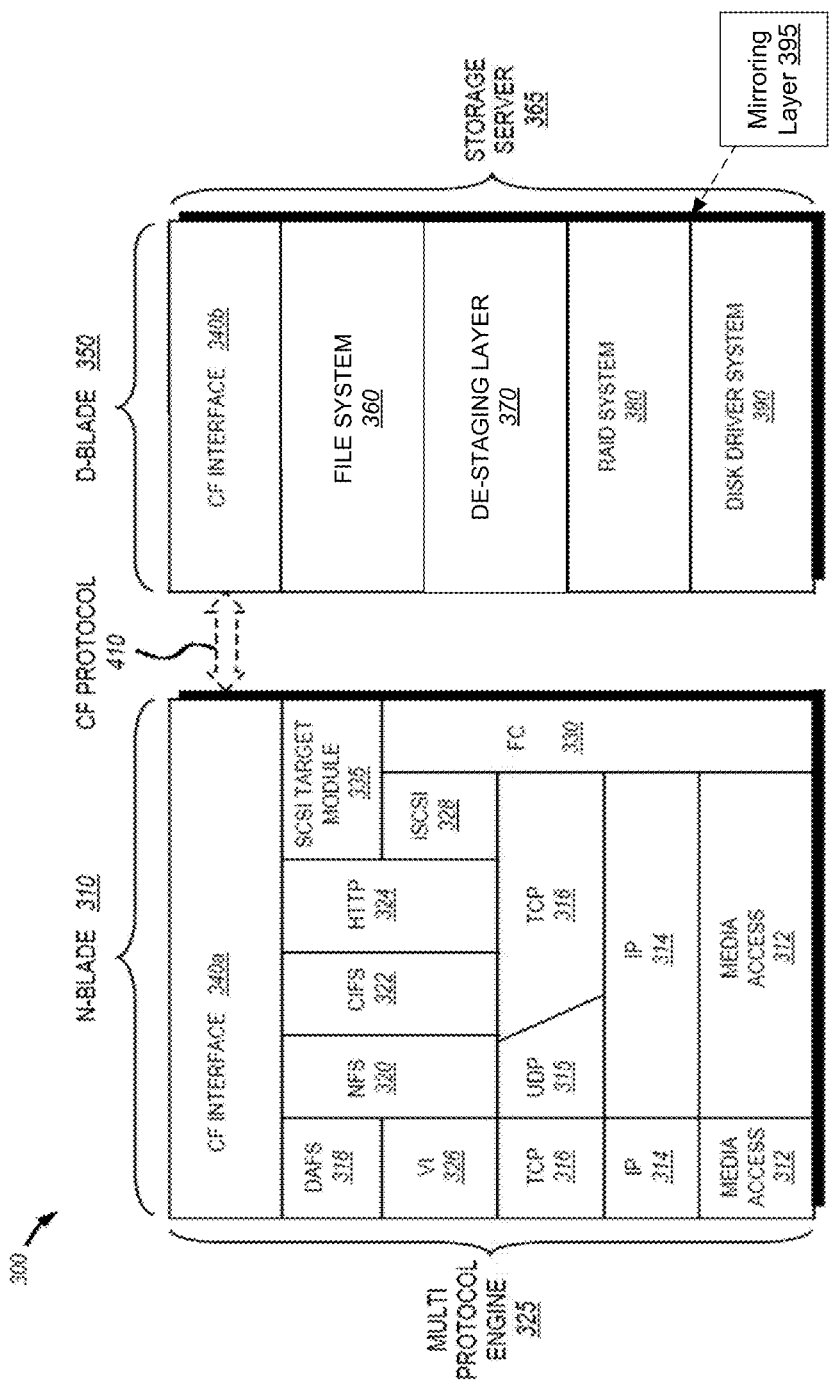
FIG. 3 is a schematic block diagram of an exemplary storage operating system that may be implemented by the node in FIG. 2.

FIG. 3 is a schematic block diagram of an exemplary storage operating system 300 that may be implemented by the node 200 in FIG. 2. The storage operating system 300 comprises a series of software layers organized to form an integrated network protocol stack or, more generally, a multi-protocol engine 325 (N-blade 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315 (that comprise a transport layer).

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 (D-blade 350) that provides data paths for accessing information stored on the disks 130 of the node 200. To that end, the storage server 365 includes a file system module 360, a de-staging layer 370, a storage/RAID system layer 380 and a disk driver system module 390. The RAID system layer 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

All inodes of the write-anywhere file system may be organized into the inode file. A file system (fs) info block specifies the layout of information in the file system and includes an inode of a data container, e.g., file, that includes all other inodes of the file system. Each logical volume (file system) has an fsinfo block that may be stored at a fixed or variable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In some embodiments, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340a,b adapted to implement intra-cluster communication among the blades (e.g., communication between blades of the same node or communication between blades of different nodes) using CF protocol messages.

For example, the protocol layers (e.g., the NFS/CIFS layers and the iSCSI/FC layers) of the N-blade 310 may function as protocol servers that translate file-based and block-based access requests from clients 180 into CF protocol messages used for communication with the D-blade 350. In some embodiments, the N-blade servers convert the incoming client access requests into file system primitive operations (commands) that are embedded within CF protocol messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

In some embodiments, the N-blade 310 and D-blade 350 are implemented as separately-scheduled processes of storage operating system 300. In other embodiments, the N-blade 310 and D-blade 350 may be implemented as separate software components/code within a single operating system process. Communication between an N-blade and D-blade in the same node 200 is thus illustratively effected through the use of CF messages passing between the blades. In the case of remote communication between an N-blade and D-blade of different nodes, such CF message passing occurs over the cluster switching fabric 150.

A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands/messages among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command. As used herein, the term "CF message" may be used generally to refer to LPC and RPC communication between blades of the cluster.

In some embodiments, the storage operating system 300 also comprises a de-staging layer 370 that operates in conjunction with the file system 360 and other software layers of the storage operating system 300 to produce and store write logs to the local non-volatile storage device 230. In general, the de-staging layer 370 may receive write requests for files and perform the received write requests in two stages. In a first stage, write requests received by the file system layer 360 are sent to the de-staging layer 370. The de-staging layer 370 produces a write log for each received write request, a write log representing the write request. The write logs may be stored to the local non-volatile storage device 230. In a second stage, upon occurrence of a predetermined initiating event (referred to as a "consistency point"), accumulated local write logs stored in the local volatile storage device may be performed on the storage devices. To do so, the accumulated local write logs may be sent to the RAID system layer 380 that then performs the write logs. The consistency point may be initiated by various predetermined initiating events such as the occurrence of a predetermined time interval, etc.

In some embodiments, the storage operating system 300 also comprises a mirroring layer 395 that may reside underneath the storage/RAID system layer 380 and be a peer layer of the disk driver system layer 390, as shown in FIG. 3. In other embodiments, the mirroring layer 395 may reside near other layers of the storage operating system 300. In some embodiments, the mirroring layer 395 may be pre-included in storage operating system 300 software. In other embodiments, the mirroring layer 395 may comprise an external auxiliary plug-in type software module that works with the storage operating system 300 to enhance its functions.

B. Mirroring Layer

To ensure data consistency and provide failover protection, the write logs may be stored to the local non-volatile storage device 230 (as described above) and also be mirrored/stored to a remote non-volatile storage device 230 at a remote partner node. The file system 360 and/or the de-staging layer 370 may comprise mirroring clients that utilize and request data mirroring services of the mirroring layer 395. In some embodiments described below, the file system 360 may comprise a mirroring client that produces the write logs, the write logs comprising the data and metadata that are to be mirrored/stored to the remote non-volatile storage device 230 for illustrative purposes only. In other embodiments, other mirroring clients may use the mirroring layer 395 and/or produce other types of data and metadata, other than write logs, that are to be mirrored/stored to the remote non-volatile storage device 230 by the mirroring layer 395.

As used herein, a mirroring client executing on a local node (e.g., local node A) may produce "local" data and metadata 285 stored to the local non-volatile storage device 230. The mirroring client may also send its local data and metadata 285 to the mirroring layer/engine 395 for storing to a remote node (e.g., remote node B), using methods described herein. Likewise, a mirroring client on the remote node may send its data and metadata (shown as "remote" data and metadata 290) to its mirroring layer/engine 395 for storing to the local non-volatile storage device 230 of the local node, using methods described herein.

C. Data and Metadata Mirroring to Remote Node

Currently, remote mirroring of data and metadata may produce a significant amount of metadata overheard for each mirroring client, whereby each metadata set produced by the mirroring client is sent from the local node to the remote node for storage. The metadata overhead caused by the mirroring clients contributes to network congestion between the nodes and consume data bandwidth of the network connection.

Figure 4A:
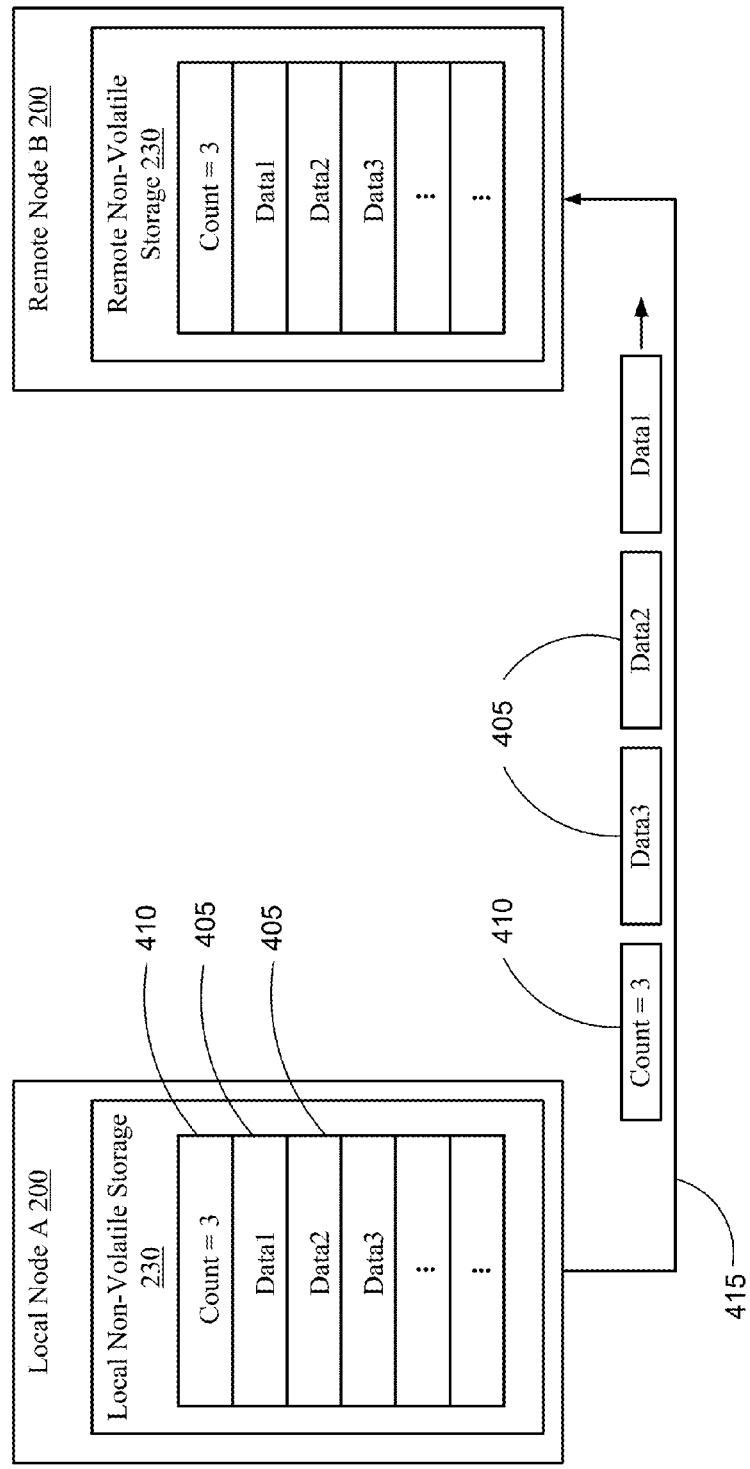
FIGS. 4A-B show conceptual diagrams illustrating conventional mirroring of data and metadata between a local node and remote node.
Figure 4B:
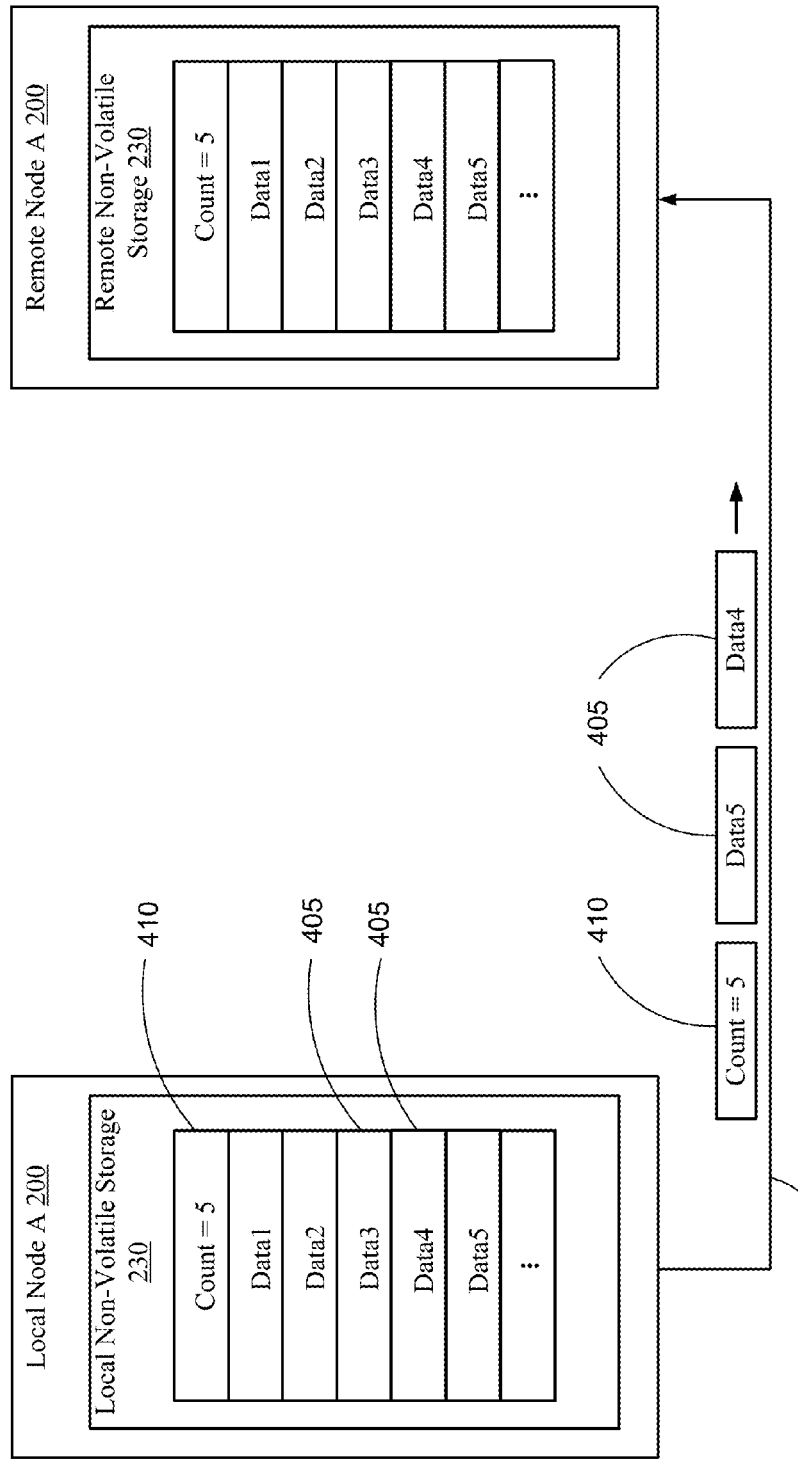

FIGS. 4A-B show conceptual diagrams illustrating conventional mirroring of data and metadata between a local node and remote node. As shown in FIG. 4A, a local node A 200 comprises a local non-volatile storage device 230 storing various data sets 405 and metadata sets 410. In the examples of FIGS. 4A-B, the local non-volatile storage device 230 stores a first related group comprising data sets Data1, Data2, and Data3 and metadata set Count=3 and a second related group comprising data sets Data4 and Data5 and metadata set Count=5. The data sets 405 and metadata sets 410 may be stored to the local non-volatile storage device 230 by a mirroring client (e.g., software layer or application) executing on the local node A. A data set 405 may comprise user/client data sent from a user/client (such as an application) to the mirroring client. As such, a data set 405 is typically not produced by the mirroring client. A metadata set 410 may comprise metadata that describes one or more data sets 405. Metadata sets 410 may be produced by the mirroring client to assist in processing the data sets 405.

Note that in both the local and remote non-volatile storage devices 230, for each mirroring client, there is typically assigned a predetermined storage address location for storing metadata sets of the mirroring client. The metadata sets of a mirroring client are typically stored to the same predetermined storage address location, rather than to new locations in the local and remote non-volatile storage devices 230. As such, any new metadata set received from a particular mirroring client typically overwrites/updates the prior received metadata set at the same predetermined storage address location for the particular mirroring client. This is shown in FIG. 4B where the new metadata set Count=5 has overwritten the previous metadata set Count=3 in the same storage location in the local and remote non-volatile storage devices 230.

The mirroring client may send the data sets 405 and metadata sets 410 to a conventional mirroring layer 395 (executing on the local node A) for mirroring/storing to the remote non-volatile storage device 230 on the remote node B. The data and metadata sets may be transmitted from the local node A to the remote node B through a connection system 415. The mirroring layer 395 may typically transmit all of the received data sets 405 and metadata sets 410 to the remote node B, which may cause connection congestion between the nodes.

In some embodiments, the connection system 415 may provide a single connection path between the local and remote nodes, which results in "in-order delivery" (IOD) of data and metadata between the local and remote nodes. For IOD, the data and metadata is expected to be received at the remote node in the same time order as it was sent at the local node. For example, if data sets are sent at the local node in a time order comprising data sets W, X, and then Y, the remote node receives the data sets in the same time order (i.e., receive in order W, X, and then Y).

In other embodiments, the connection system 415 may comprise the cluster switching fabric 150 that provides multiple connection paths between the local and remote nodes 200 in the cluster 100. The cluster switching fabric 150 may utilize any type of network connection, switches, and/or protocols known in the art. For example, the cluster switching fabric 150 may comprise a Fibre Channel interconnect using Fibre Channel fabric switches, an Ethernet interconnect using Gigabit Ethernet switches and Ethernet clustering protocol, etc. The multiple connection paths may be provided through multiple hardware connections between the nodes. Multiple connection paths may be implemented to increase data throughput and bandwidth between the nodes. Use of multiple connection paths between the nodes may result in "out-of-order delivery" (OOD) of data and metadata. For OOD, the data and metadata is not expected to be received at the remote node in the same time order as it was sent at the local node and may arrive in any order. As such, in the above example, data set Y may arrive at the remote node prior to data sets W and X in OOD.

Some embodiments below may describe a single or multiple connection path and/or IOD or OOD of data and metadata between the nodes for illustrative purposes. However, methods described herein may be used to reduce the number of metadata sets transmitted between the nodes, regardless of the type of connection system 415 or the delivery type (IOD or OOD) used between the nodes.

In the example of FIG. 4A, for illustrative purposes, the connection system 415 may provide a single connection path between the nodes resulting in IOD of data and metadata between the local and remote nodes. In the example of FIG. 4A, the data and metadata sets are transmitted from the local node A in the following time order: Data1 is sent first, Data2 is sent second, Data3 is sent third, and Count=3 is sent fourth. As such, the data and metadata sets are received and stored to the remote storage 230 at the remote node B in the same following time order: Data1 is received and stored first, Data2 is received and stored second, Data3 is received and stored third, and Count=3 is received and stored fourth.

Similarly, in the example of FIG. 4B, the data and metadata sets are transmitted from the local node A in the following time order: Data4, Data5, and then Count=5; then the data and metadata sets are received and stored at the remote node B in the same time order: Data4, Data5, and then Count=5. Note that the new metadata set Count=5 overwrites/updates the prior received metadata set Count=3 at the same predetermined storage address location for the particular mirroring client in the local and remote non-volatile storage devices 230.

For example, the mirroring client may comprise the file system 360 that writes data 405 and metadata 410 to the local non-volatile storage device 230 and also sends the data 405 and metadata 410 to the mirroring layer 395 for mirroring/storing to the remote non-volatile storage device 230. In this example, file system 360 may periodically produce metadata sets to assist in tracking the data sets it produces. For example, the file system 360 may produce metadata ("Count") that may specify the number of valid client data sets that have been currently produced so far by the file system 360 for storage to the local and remote non-volatile storage devices 230. As such, in the above example, the metadata set "Count=3" specifies that 3 valid client data sets (Data1, Data2, and Data3) have been produced so far for storage to the local and remote non-volatile storage devices 230. When 2 more valid client data sets (Data4 and Data5) are later produced by the file system 360, the file system 360 may then produce an updated metadata set "Count=5" that specifies that a total of 5 valid client data sets (Data1-Data5) have been produced so far.

As such, the metadata sets produced by a mirroring client (e.g., file system) may specify the total accumulated number of data sets currently produced by the mirroring client and sent to the mirroring layer 395 for storing to the remote node. Because of the accumulative nature of the metadata sets, the data contained in a new metadata set may encompass or encapsulate data contained in a previous metadata set. For example, the new metadata set "Count=5" may be viewed as encompassing or encapsulating data contained in the previous metadata set "Count=3". In certain circumstances, only sending and storing the new metadata set "Count=5" to the remote node may produce the same end result as sending the previous metadata set "Count=3" and then the new metadata set "Count=5". This is because both the metadata sets are overwritten to the same predetermined storage location in the remote non-volatile storage device 230 and the new metadata set encompasses the previous metadata set.

In some embodiments, the mirroring layer 395 coalesces two or more metadata sets/requests to produce a metadata chain comprising a grouping two or more metadata sets/requests. In some instances, a metadata set of a metadata chain may be selected for sending to the remote node for storing, wherein the other metadata sets of the metadata chain are not sent to the remote node. In these embodiments, the selected metadata set may represent all the metadata sets in the chain and be the only metadata set in the chain that is transmitted and stored to the remote node. For example, in some circumstances, the metadata set "Count=3" and the metadata set "Count=5" may be coalesced to produce a metadata chain, and only the metadata set "Count=5" may be transmitted to the remote node for storage, wherein the metadata set "Count=3" is not transmitted to the remote node. Typically, however, each metadata set received by the mirroring layer is sent to the remote node (as shown in the examples of FIGS. 4A-B).

In some examples described herein, the mirroring client comprises the file system 360 and the data 405 and metadata 410 pertains to write logs. In other embodiments, the mirroring client may comprise another software layer or application and the data 405 and metadata 410 may not pertain to write logs.

Each mirroring client may produce and send its own separate stream of data and metadata to the mirroring layer 395 for processing, the stream comprising related groups of data and metadata. As such, related groups of data and metadata will be produced and received from the same mirroring client. The storage size for the data and metadata sets typically vary depending on how the mirroring client produces the data and metadata sets, although there is typically a maximum storage size to a single data or metadata set (e.g., 64 KB). The ratio of data sets to a metadata set produced may vary depending on the mirroring client. For illustrative purposes, some embodiments described below describe a mirroring client that produces and sends one metadata set for every two data sets, whereby each related group comprises two data sets and one metadata set. In other embodiments, however, other ratios of data sets to a metadata set may be used.

III. Reducing Metadata in Remote Mirroring

A. Overview

Described herein are a system and method for remote mirroring/copying data and metadata sets from a local node to a remote node that reduces the number of metadata sets that are mirrored. In some embodiments, the local node may coalesce metadata sets into metadata chains, each metadata chain comprising two or more metadata sets. In some instances, a metadata set of a metadata chain may be selected for sending to the remote node for storing, wherein the other metadata sets of the metadata chain are not sent to the remote node. In these embodiments, the selected metadata set may represent all the metadata sets in the chain and be the only metadata set in the chain that is transmitted and stored to the remote node. As such, the network congestion between the local and remote nodes may be reduced.

In some embodiments, a mirroring layer 395 of a storage operating system 300 executing on the local node may be configured to perform embodiments described herein. For each mirroring client sending data and metadata sets to the mirroring layer, the mirroring layer may produce a data and metadata request (DMR) data structure and a metadata request (MR) data structure. The mirroring layer 395 may treat each received data and metadata set as a request (having an assigned unique request identifier "XID") from the mirroring client to mirror/store the data or metadata set to the remote node. The mirroring layer may queue/store each received data and metadata set/request to the DMR data structure for the mirroring client. The mirroring layer 395 may also queue/store each received metadata set/request to the MR data structure for the mirroring client.

The mirroring layer may queue/store received requests to the DMR and MR data structures based on the time order the requests are received. For example, earlier received requests may be stored towards the top of the DMR and MR data structures and later received requests may be stored towards the bottom of the DMR and MR data structures. As such, the request ordering from the top to the bottom of the DMR and MR data structures comprises the earliest received request to the latest received request. As data and metadata requests are completed (i.e., successfully stored to the remote node), the mirroring layer may remove completed requests from the DMR and MR data structures.

In some embodiments, the mirroring layer may use the MR data structure to manage metadata chains (e.g., produce, break, and/or delete metadata chains). As used herein, each metadata chain may comprise a head metadata request, a tail metadata request, and zero or more middle metadata requests. The head metadata request may comprise a metadata request that is received earlier than the tail metadata request and is stored above the tail metadata request in the DMR and MR data structures. In some embodiments, a metadata chain comprises two or more adjacent/consecutive metadata requests stored in the MR data structure.

In some embodiments, the mirroring layer may coalesce a newly received metadata request with a previously received metadata request in the MR data structure to produce a chain if certain conditions exist. For example, the metadata requests may be coalesced if both metadata requests are to be stored to the same storage address location at the remote non-volatile storage device 230 at the remote node, both metadata requests have the same data size, or the previous metadata request has not yet been transmitted to the remote node. In other embodiments, the mirroring layer may require all three conditions, or any combination of the three conditions, for coalescing the two metadata requests to produce a chain.

In some embodiments, a metadata chain is specified by two pointers to two metadata requests stored in the MR data structure comprising the first/top and last/bottom metadata requests of the chain. In these embodiments, two "chain pointers" may be used to specify each metadata chain, a chain head pointer comprising an address pointer to the head metadata request in the MR data structure and a chain tail pointer comprising an address pointer to the tail metadata request in the MR data structure.

As used herein, a "representative" metadata request comprises a metadata request in a metadata chain that is the only metadata request in the chain that is sent to the remote node. A "represented" metadata request may comprise the other metadata requests in the metadata chain that are not sent to the remote node. In some embodiments, the mirroring layer may send, to the remote node, only the representative metadata request in a metadata chain (and not send represented metadata requests to the remote node) only in certain circumstances.

In some embodiments, only the representative metadata request in a chain is sent when the metadata requests in the chain comprise the top-most requests currently stored in the DMR data structure (i.e., the metadata requests in the chain comprise the earliest received requests currently stored in the DMR data structure), with no intervening requests between the metadata requests in the chain. For example, if the chain comprises two metadata requests, only the representative metadata request in the chain is sent if the two metadata requests in the chain comprise the top two requests in the DMR data structure. For a chain comprising three metadata requests, only the representative metadata request in the chain is sent if the three metadata requests in the chain comprise the top three requests in the DMR data structure, and so forth.

In further embodiments, the representative metadata request comprises the tail metadata request in the chain. As such, the representative metadata request is the last received metadata request in the chain. Thus, the representative metadata request may encompass or encapsulate data contained in the previous received metadata requests in the chain. For example, a chain may comprise metadata set/request "Count=3" and later received metadata set/request "Count=5". The metadata request "Count=5" may comprise the representative metadata request that encompasses the previous received metadata request "Count=3".

Typically, each mirroring client will continually query the mirroring layer to determine if its data and metadata sets/requests sent to the mirroring layer have been completed. The mirroring layer may also produce a request field ("last_cmplt_request") for indicating the request identifiers (XIDs) of sets/requests that have been currently completed thus far.

In some embodiments, the mirroring layer 395 may perform remote mirroring, without use of a processor 222 executing on the remote node. In these embodiments, the mirroring layer 395 may perform the remote mirroring using remote direct memory access (RDMA) methods without requiring use or involvement of a processor 222 of the remote node. As known in the art, RDMA comprises a communications protocol that provides transmission of data from the memory (e.g., local non-volatile storage device 230) of one computer (e.g., local node A) to the memory (e.g., remote non-volatile storage device 230) of another computer (e.g., remote node B) without involving the processor of the other computer.

B. Methods for Reducing Metadata

Figure 5:
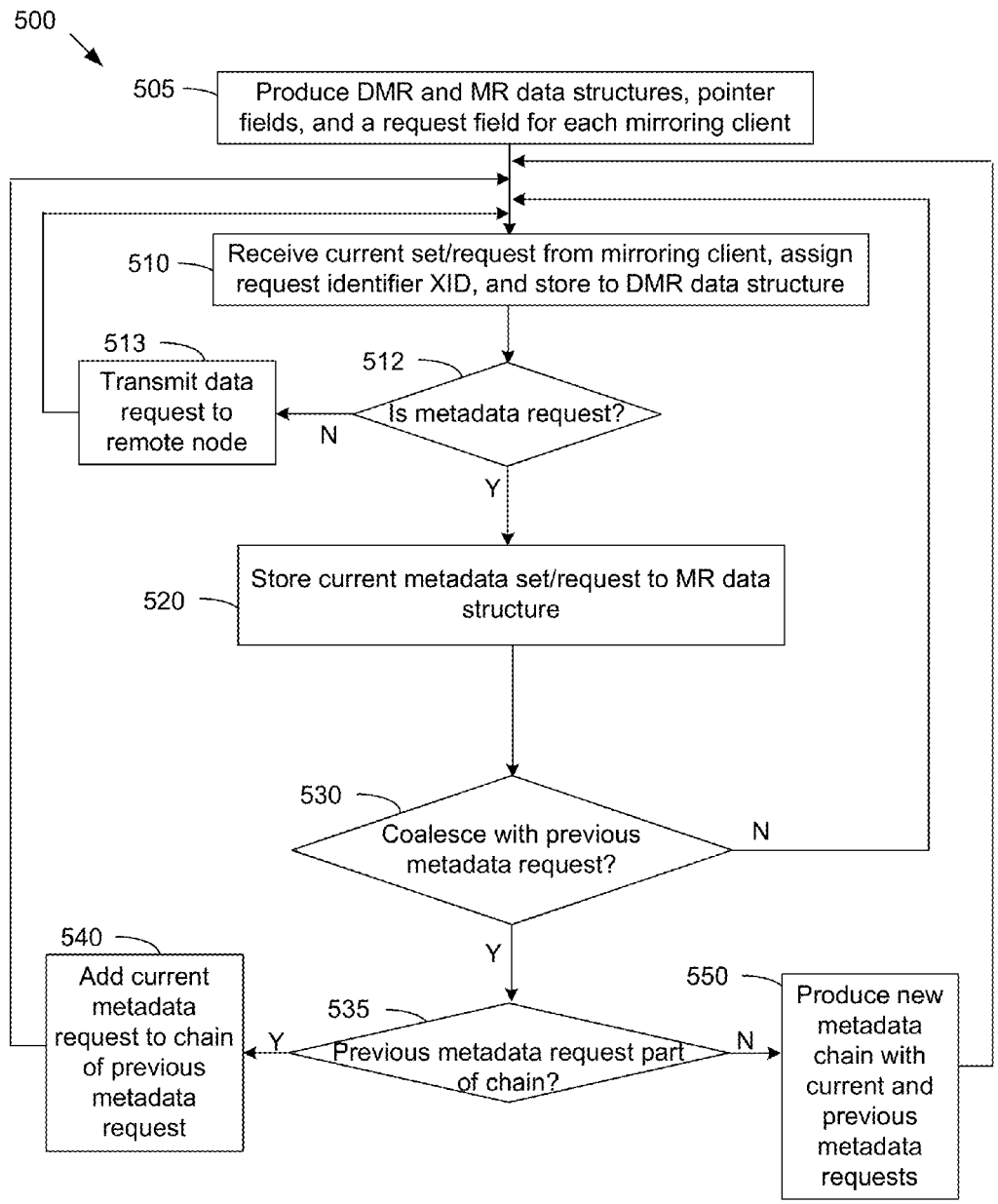
FIG. 5 is a flowchart of a method for receiving and processing data and metadata sets/requests from the mirroring client and producing metadata chains.
Figure 6:
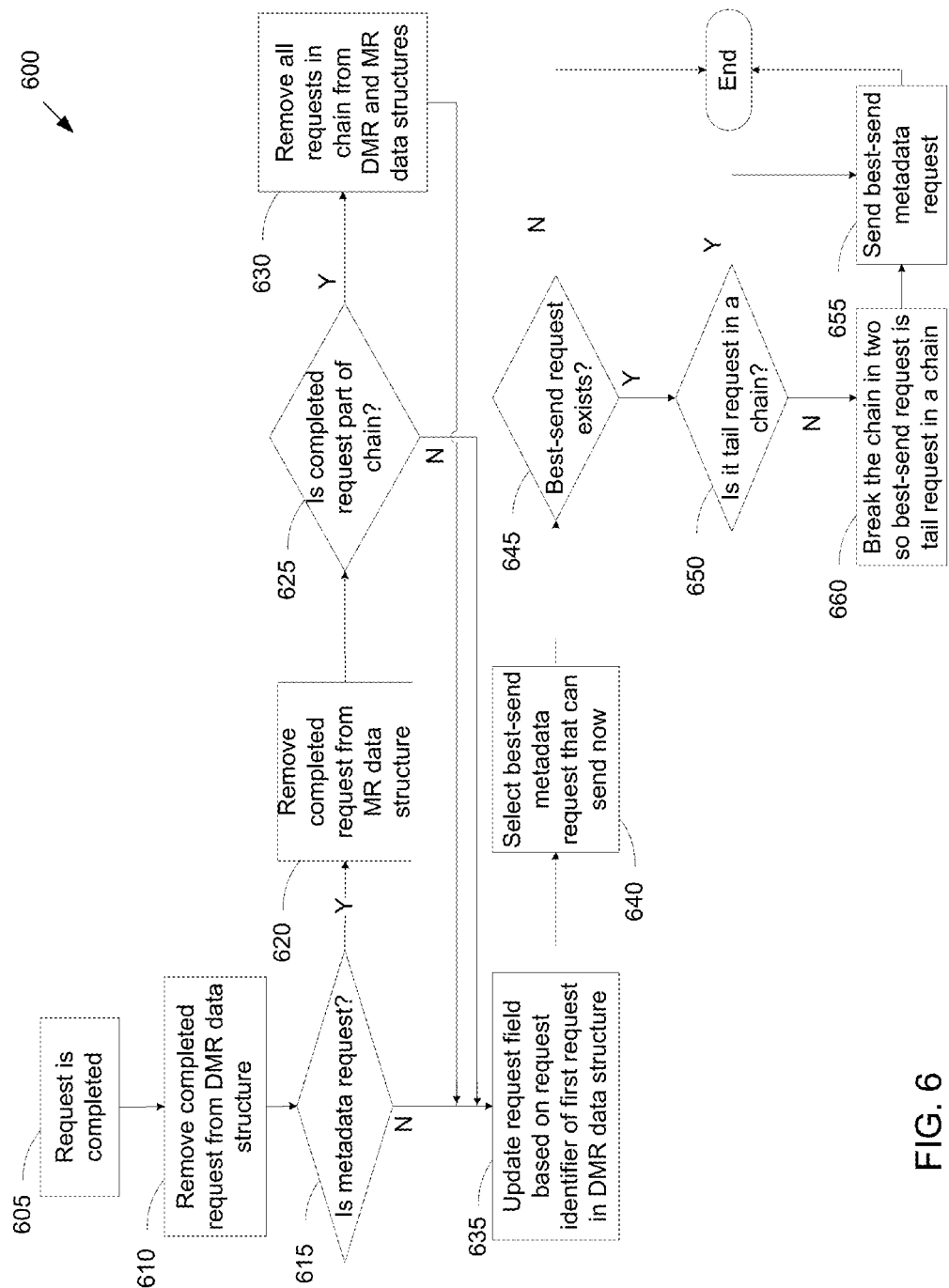
FIG. 6 is a flowchart of a method for processing completed data and metadata requests and sending particular metadata requests to the remote node.
Figure 7:
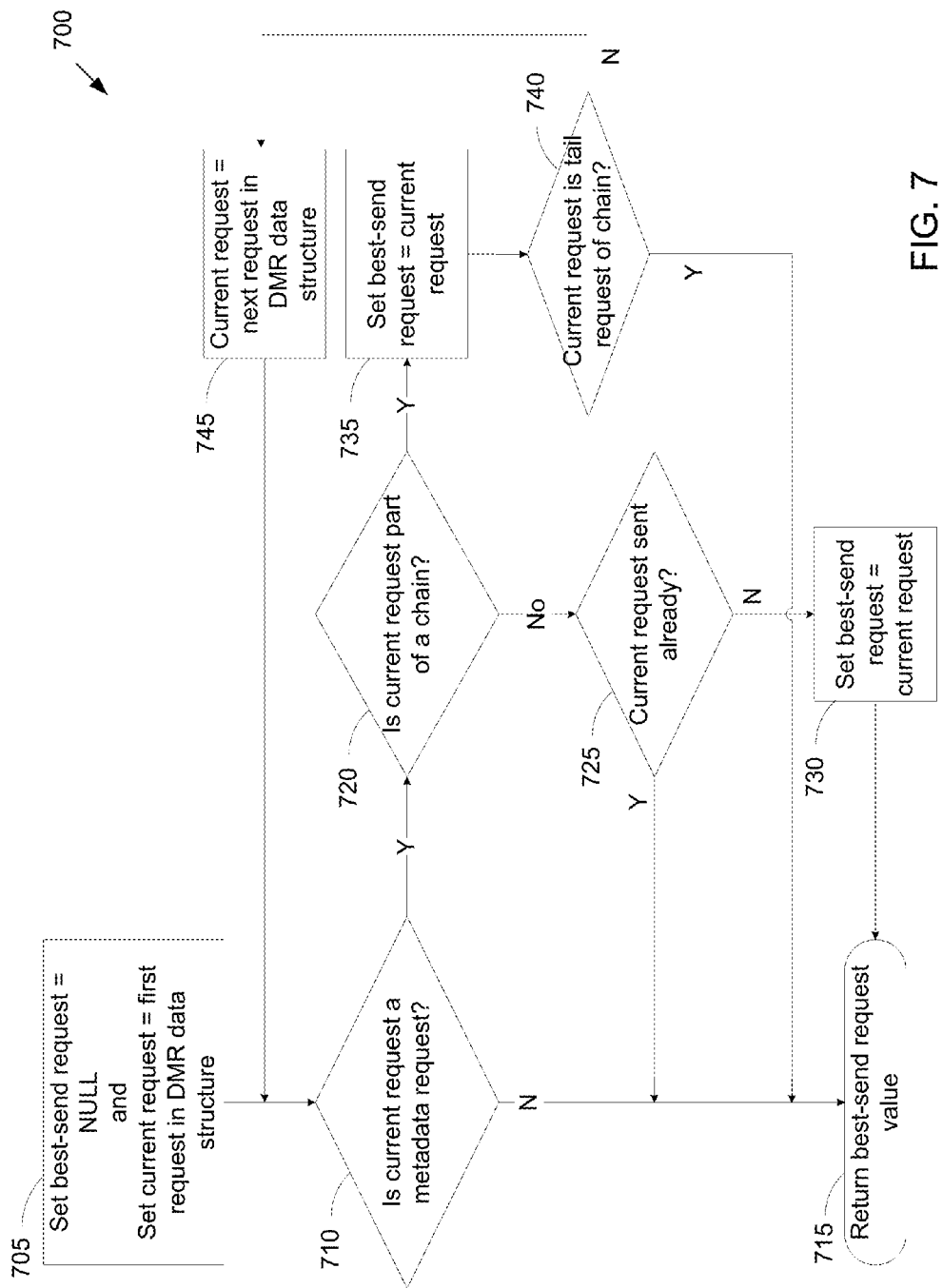
FIG. 7 is a flowchart of a method for selecting a "best-send metadata request" that is currently sent to the remote node.

FIGS. 5-7 comprise flowcharts of methods used for remote mirroring of data and metadata to a remote node, while reducing the amount of metadata. FIG. 5 is a flowchart of a method 500 for receiving and processing data and metadata sets/requests from the mirroring client and producing metadata chains. FIG. 6 is a flowchart of a method 600 for processing completed data and metadata requests and sending particular metadata requests to the remote node. FIG. 7 is a flowchart of a method 700 for selecting a "best-send metadata request" that is currently sent to the remote node. The method 500 of FIG. 5 and the method 600 of FIG. 6 may be performed concurrently. The method 700 of FIG. 7 may comprise a sub-process of the method 600 of FIG. 6 and may be called by the method 600 to select the particular metadata request to send to the remote node.

Some steps of the methods 500, 600, and 700 are described and conceptually illustrated in relation to FIGS. 8 and 9A-I. In some embodiments, some of the steps of the methods 500, 600, and 700 are implemented by software and/or hardware. In some embodiments, some of the steps of methods 500, 600, and 700 are performed by the mirroring layer/engine 395 residing and executing on the operating system of a local node 200. The mirroring layer/engine 395 may perform the methods 500, 600, and 700 in conjunction with other software layers of the operating system. In some embodiments, the remote node comprises a predetermined failover partner node of the local node. The order and number of steps of the methods 500, 600, and 700 are for illustrative purposes only and, in other embodiments, a different order and/or number of steps are used.

The mirroring layer/engine 395 may concurrently perform the methods 500, 600, and 700, in parallel, for each mirroring client that sends data and metadata sets to the mirroring layer/engine 395 for mirroring/storing the data and metadata sets to the remote node. The mirroring client may comprise, for example, a software layer of the storage operating system 300 or any application executing on the local node.

FIG. 5 is a flowchart of a method 500 for receiving and processing data and metadata sets/requests from the mirroring client and producing metadata chains. For each mirroring client that sends data and metadata sets to the mirroring layer/engine 395, the method 500 produces and maintains (at 505) a DMR data structure, an MR data structure, pointer fields, and a request field ("last_cmplt_request"). In general, the DMR data structure may be used to queue/store data and metadata sets/requests and the MR data structure may be used to queue/store metadata sets/requests received from the mirroring client. The pointer fields may be used to store chain pointers that specify metadata chains.

The request field may be used to indicate currently completed requests of the mirroring client at the remote node and be used to respond to completion queries from the mirroring client. Typically, each mirroring client will continually submit completion queries to the mirroring layer to determine if its data and metadata sets/requests sent to the mirroring layer have been completed (i.e., stored to the remote node). The mirroring layer may produce the request field for indicating the request identifiers of sets/requests that have been currently completed thus far. Each completion query may contain a request identifier for a prior submitted set/request, and the mirroring layer may respond to the completion query based on the request identifier value stored in the request field.

Figure 8:
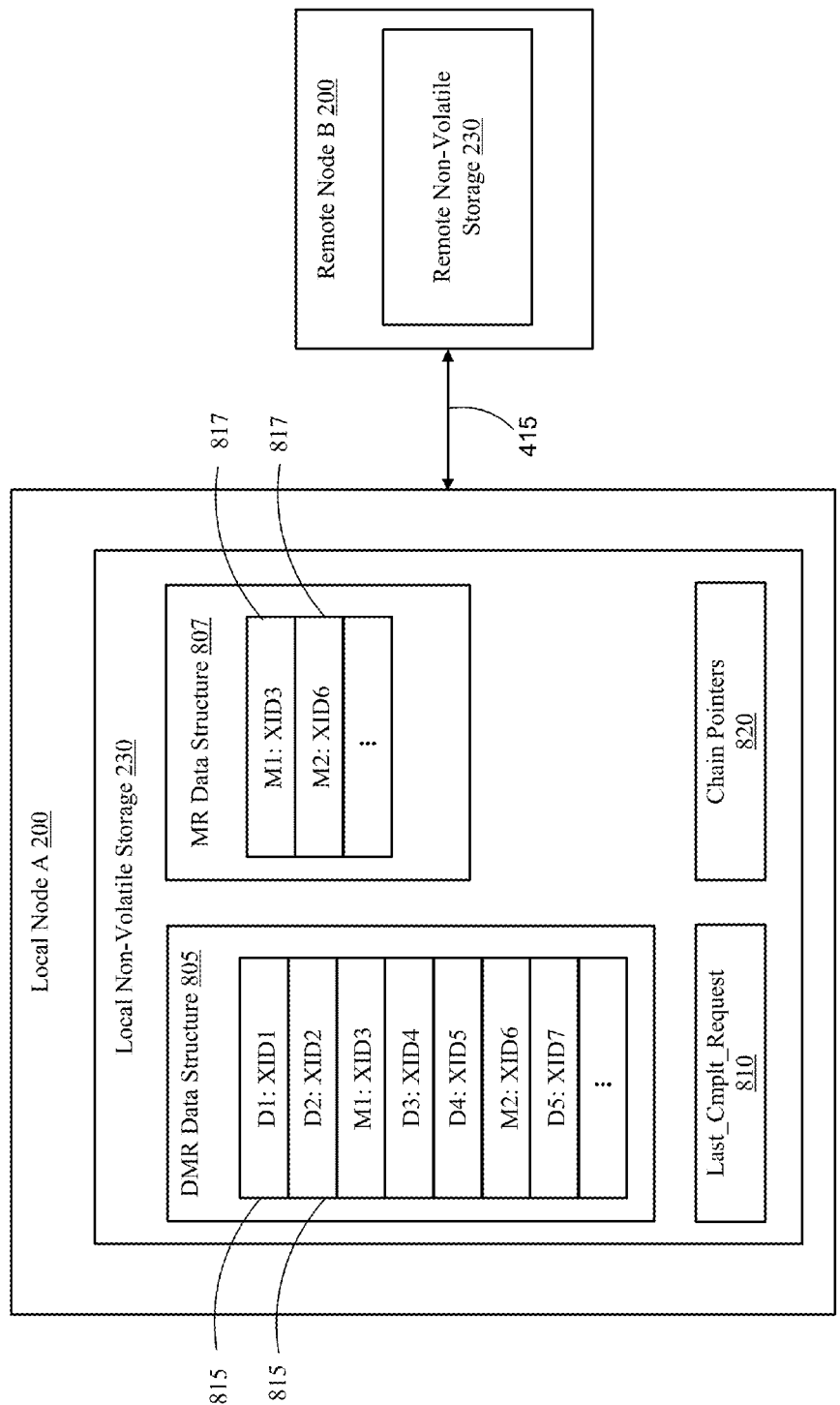
FIG. 8 shows a conceptual diagram of a local node A having an exemplary DMR data structure and MR data structure.

FIG. 8 shows a conceptual diagram of a local node A 200 having an exemplary DMR data structure 805, MR data structure 807, request field ("last_cmplt_request") 810, and chain pointer fields 820 that are stored in the local non-volatile storage device 230. In other embodiments, the DMR data structure 805, MR data structure 807, request field ("last_cmplt_request") 810, and chain pointer fields 820 may be stored elsewhere on the local node (e.g., in memory 224, etc.). FIG. 8 also shows that the local node A 200 is connected with a remote node B, having a remote non-volatile storage device 230, through a connection system 415 that may provide a single data connection paths (resulting in IOD) or multiple data connection paths (resulting in OOD) between local node A and remote node B.

The method 500 receives (at 510) a current data or metadata set/request from the mirroring client and generates and assigns a unique request identifier (XID) for the received set/request. In some embodiments, the request identifiers may comprise increasing sequential numbers (e.g., 1, 2, 3 . . . ) that are assigned to the received data and metadata sets/requests in the time order they are received. In some embodiments, a request having a lower request identifier (XID) is received before another request having a higher request identifier (XID). As such, the request identifiers may indicate the time ordering of when requests were received by the method 500 relative to each other. The method 500 also stores (at 510) each received data or metadata set/request, along with the assigned request identifier XID, to the DMR data structure 805. Each set/request and assigned request identifier may comprise an entry 815 in the DMR data structure 805.

The method 500 then determines (at 512) whether the received set/request is a metadata set/request. If not, the received set/request is a data set/request and the method 500 then transmits (at 513) the data set/request to the remote node B 200 for storage to the remote non-volatile storage device 230. Note that transmitting a data set/request in the DMR data structure 805 does not remove/delete the data set/request from the DMR data structure 805. The method 500 then continues at step 510 where a next set/request is received.

If the current received set/request is a metadata set/request (at 512—Yes), the method 500 stores (at 520) the received metadata set/request, along with the assigned request identifier XID, to the MR data structure 807. Each metadata set/request and assigned request identifier may comprise an entry 817 in the MR data structure 807.

In some embodiments, the method 500 may store the requests to the DMR and MR data structures 805 and 807 based on the time order they are received, where an earlier received set/request is stored to a higher entry in the data structure than a later received set/request. For example, the method may fill the DMR data structure 805 beginning from a first/top entry 815 to a last/bottom entry 815, and likewise for the MR data structure 807. In some embodiments, a higher entry in the DMR data structure 805 may comprise a request received before another request in a lower entry in the DMR data structure 805, and likewise for the MR data structure 807. As such, the entry positions of the data and metadata requests in the DMR data structure 805 may indicate the time ordering of when the requests were received by the method 500 relative to each other, and likewise for the MR data structure 807.

FIG. 8 shows a conceptual diagram of exemplary data and metadata sets/requests stored in entries 815 of the DMR data structure 805 and exemplary metadata sets/requests stored in entries 817 of the MR data structure 807. In the example of FIG. 8, the mirroring client produces and sends one metadata set for every two data sets, the received data and metadata sets/requests comprising a first related group comprising data sets/requests D1 and D2 and metadata set/request M1 (Count=2), a second related group comprising data sets/requests D3 and D4 and metadata set/request M2 (Count=4), and so forth. The method 500 has generated and assigned request identifiers (XIDs) according to the time order the requests are received, such as D1: XID1, D2: XID2, M1: XID3, D3: XID4, D4: XID5, M2: XID6, etc. The method 500 has also stored the requests to the DMR data structure 805 according to the time order the requests are received, so that the first received D1: XID1 is stored to a first/top entry 815 and the later received D3: XID4 is stored to a lower entry 815 in the DMR data structure 805. The method 500 has also stored the metadata requests to the MR data structure 807 according to the time order the metadata requests are received.

The method 500 then determines (at 530) whether the currently received metadata set/request is to be coalesced with a previous received metadata set/request to produce a metadata chain comprising the two metadata sets/requests. The method 500 may do so by examining the last/bottom metadata set/request stored in the MR data structure 807 that comprises the just previous received metadata request. In some embodiments, the method 500 determines (at 530—Yes) that the currently received metadata set/request is to be coalesced with the previous metadata set/request if the following conditions exist. First, both the current and previous metadata requests are to be stored to the same storage address location at the remote non-volatile storage device 230 at the remote node. Note that metadata sets/requests for the same mirroring client may be stored to the same storage address location at the remote node. Second, both the current and previous metadata requests have the same data size. Third, the previous metadata request has not yet been transmitted to the remote node. In other embodiments, the method 500 may require all three conditions to exist, or any combination of the three conditions to exist, to determine that the current and previous metadata requests are to be coalesced.

If the method 500 determines (at 530—No) that the current and previous metadata requests are not to be coalesced, the method 500 returns to step 510. If the method 500 determines (at 530—Yes) that the metadata requests are to be coalesced, the method 500 determines (at 535) whether the previous metadata request is already part of a metadata chain. For example, the method 500 may do so by examining the chain pointer fields 820 that indicate metadata requests in the MR data structure 807 comprising a metadata chain. If so, the method 500 adds (at 540) the current metadata request to the metadata chain of the previous metadata request. The method 500 may do so by updating the chain tail pointer (in the pointer fields 820) that stores the address location of the previous metadata request to now store the address location of the current metadata request in the MR data structure. The current metadata request may now comprise the new tail metadata request of the chain. The method 500 then continues at step 510 where a next set/request is received.

If not, the method 500 produces (at 550) a new metadata chain comprising the current and previous metadata requests. The method 500 may do so by producing new chain pointers (in the pointer fields 820) including a new chain head pointer that stores the address location of the previous metadata request and a new chain tail pointer that stores the address location of the current metadata request. The previous metadata request may now comprise the head metadata request and the current metadata request may now comprise the tail metadata request of the new chain. The method 500 then continues at step 510 where a next set/request is received.

FIG. 6 is a flowchart of a method 600 for processing completed data and metadata requests and sending particular metadata requests to the remote node. The method 600 is triggered/initiated when the method determines (at 605) that a data or metadata set/request has been completed (i.e., successfully stored to the remote non-volatile storage device 230 on the remote node B 200). The method 600 may determine such when it receives a request-completion acknowledgement from the remote node B. Typically, the remote node will receive the data and metadata sets/requests from the local node, and upon completing the storing of a particular data or metadata set/request to the remote non-volatile storage device 230, will transmit a request-completion acknowledgement to the local node indicating that the particular data or metadata set/request is completed. For example, the transport layer (low level driver) of the remote node may transmit the request-completion acknowledgements to the local node. The request-completion acknowledgement may include the request identifier XID of the completed data or metadata set/request.

The method 600 then removes/deletes (at 610) the completed data or metadata set/request from the DMR data structure 805 (e.g., by locating and deleting the entry 815 having the same request identifier as the completed set/request). The method then determines (at 615) whether the completed request comprises a metadata request. If not, the method 600 continues at step 635. If so, the method 600 removes/deletes (at 620) the completed metadata set/request from the MR data structure 807 (e.g., by locating and deleting the entry 817 having the same request identifier as the completed set/request).

The method then determines (at 625) whether the completed metadata request is part of any metadata chain. The method 500 may do so by examining the chain pointer fields 820 that indicate metadata requests in the MR data structure 807 comprising a metadata chain. If not, the method 600 continues at step 635. If the method 600 determines (at 625—Yes) that the completed metadata request is part of a particular metadata chain, the method removes/deletes (at 630) the particular metadata chain from the DMR data structure 805 and the MR data structure 807 (by removing all metadata requests of the particular metadata chain from the DMR and MR data structures). The method 600 then continues at step 635.

At step 635, the method then updates/overwrites (at 635) the request field ("last_cmplt_request") based on the request identifier XID of the first/top data or metadata set/request in the DMR data structure 805. In some embodiments, the request field ("last_cmplt_request") is updated using the following equation: last_cmplt_request=(XID of first set/request)−1.

The method 600 then selects (at 640) a "best-send metadata request" comprising the best metadata request to send to the remote node at this current point in time. The method may do so by calling the method 700 of FIG. 7 that selects the best-send metadata request (discussed below). The method 700 of FIG. 7 may return a best-send metadata request field comprising a request identifier (XID) value of the selected best-send metadata request.

The method then determines (at 645) whether a best-send metadata request exists (i.e., the value of the best-send metadata request field is not null). If a best-send metadata request does not exist (at 645—No), i.e., the value of the best-send metadata request field equals null, the method 60 ends. If a best-send metadata request does exist (at 645—Yes), the method then determines (at 650) whether the best-send metadata request comprises the tail/last metadata request of a particular metadata chain. If so, the method sends (at 655) the best-send metadata request to the remote node for storage.

If not, the method breaks (at 660) the particular metadata chain to produce two new metadata chains in a manner so that the best-send metadata request comprises a tail/last metadata request of one of the new metadata chains. The method may produce the two new metadata chains by producing, for each new metadata chain, a chain tail pointer that points to a tail metadata request and a chain head pointer that points to a head metadata request in the MR data structure 807. The method then sends (at 655) the best-send metadata request to the remote node for storage. As such, the best-send metadata request is sent to the remote node only when it is the tail/last metadata request of a metadata chain. The method 600 then ends.

FIG. 7 is a flowchart of a method 700 for selecting a "best-send metadata request" that is currently sent to the remote node. The method 700 may be called by the method 600 of FIG. 6 (at step 640) for selecting the best-send metadata request.

The method 700 begins by setting (at 705) a best-send metadata request field to equal null and a current request field to equal the request identifier (XID) of the first request currently stored in the DMR data structure 805. The method then determines (at 710) whether the current request comprises a metadata request. If not, the method 700 returns (at 715) the current value of the best-send metadata request field to the calling method 600 of FIG. 6.

If the current request comprises a metadata request, the method then determines (at 720) whether the current request is part of a metadata chain. If not, the method 700 determines (at 725) whether the current request has already been transmitted to the remote node for storage. If so, the method continues at step 715. If not, the method 700 sets (at 730) the best-send metadata request field to equal the request identifier (XID) of the current request and continues at step 715.

If the method determines (at 720—Yes) that the current request is part of a metadata chain, the method sets (at 735) the best-send metadata request field to equal the request identifier (XID) of the current request. The method 700 then determines (at 740) whether the current request is the tail/last metadata request of the metadata chain. If so, the method continues at step 715. If not, the method sets (at 745) the value of the current request field to equal the request identifier (XID) of the next request stored in the DMR data structure 805. The method then continues at step 710.

C. Illustrative Examples for Reducing Metadata

FIGS. 9A-I conceptually illustrate processes of the methods 500, 600, and 700 (described above in relation to FIGS. 5, 6, and 7) as performed by the mirroring layer 395. In the examples of FIGS. 9A-I, the mirroring client produces and sends one metadata set for every two data sets. For example, the mirroring layer 395 may receive from the mirroring client, a stream of data and metadata sets in the following order: D1, D2, M1, D3, D4, M2, D5, D6, M3, D7, D8, M4, etc. In other embodiments, other ratios of metadata sets to data sets may be used. In further embodiments, the ratio of metadata sets to data sets may continuously vary through the stream (e.g., the ratio may be 1:2, then 1:3, then 1:2, then 1:4, etc.).

In the examples of FIGS. 9A-I, the received data sets are represented as boxes with "D" (D1, D2, etc.) and received metadata sets are represented as boxes with "M" (M1, M2, etc.). The un-shaded boxes indicate sets/requests that have been transmitted to the remote node for storage. The shaded boxes indicate sets/requests that have not yet been transmitted to the remote node for storage. The received data and metadata sets/requests are stored in entries of the DMR data structure (indicated as "DMR DS") and the received metadata sets/requests are stored in entries of the MR data structure (indicated as "MR DS"). The request identifier (XID) of each received set/request is shown as a number to the left of the set/request stored in the DMR data structure. The value of the request field ("last_complt_request") at different points in time is also shown. The request field may be used to indicate currently completed requests of the mirroring client at the remote node and be used to respond to completion queries from the mirroring client.

Figure 9C:
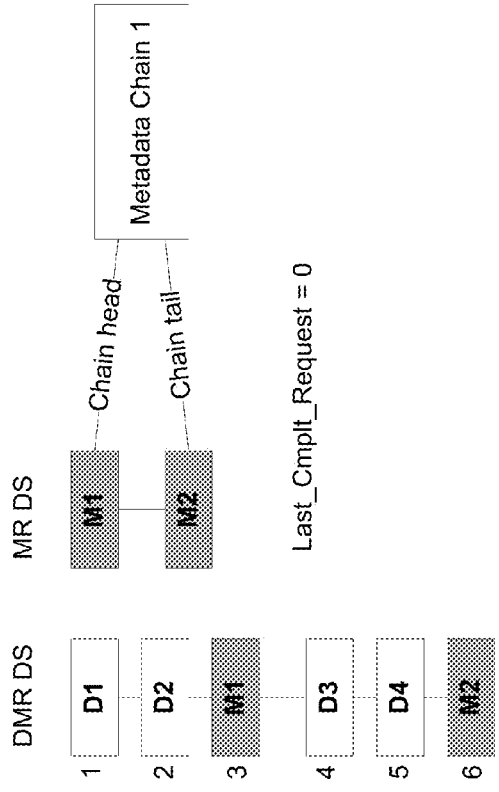
Figure 9A:
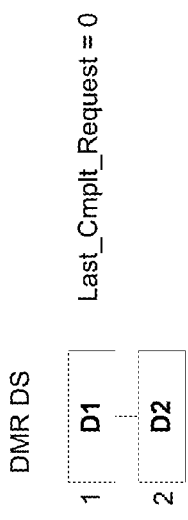

In the example of FIG. 9A, the mirroring layer receives data sets/requests D1 and D2 and stores to the DMR data structure 805 ("DMR DS") and sends the data sets/requests D1 and D2 to the remote node for storage (as indicated by the un-shaded boxes). The request field ("last_complt_request") is updated to equal the request identifier XID of the first request in the DMR data structure−1. Thus last_complt_request=1−1=0.

Figure 9B:
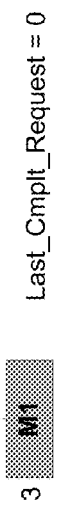

In the example of FIG. 9B, the mirroring layer receives metadata set/request M1 and stores to the DMR data structure 805 and to the MR data structure 807 ("MR DS"), and does not send the metadata set/request M1 to the remote node yet (as indicated by the shaded box). The request field ("last_complt_request") is still equal to 0. The sets/requests D1, D2, and M1 may comprise a related group.

In the example of FIG. 9C, another related group comprising sets/requests D3, D4, and M2 are received. The data sets/requests D3 and D4 are stored to the DMR data structure and are sent to the remote node for storage. The metadata set/request M2 is stored to the MR data structure 807 and not sent to the remote node yet. The request field ("last_complt_request") is still equal to 0.

In the example of FIG. 9C, the three conditions for coalescing the M1 and M2 metadata requests are found to exist: 1) both M1 and M2 are to be stored to the same storage address location at the remote non-volatile storage device 230 at the remote node; 2) both M1 and M2 have the same data size; 3) the previous metadata request M1 has not yet been transmitted to the remote node. Since M1 is not already a part of a metadata chain, a new metadata chain is produced comprising M1 as the head metadata request and M2 as the tail metadata request. As shown in FIG. 9C, a new chain head pointer ("Chain head") is produced that stores the address location of the M1 metadata request and a new chain tail pointer ("Chain tail") is produced that stores the address location of the M2 metadata request, the two new pointers specifying the new metadata chain ("metadata chain 1").

In the example of FIG. 9D, data request D2 has been completed, whereby a request-completion acknowledgement for data request D2 has been received from the remote node. The completed data request D2 is then removed from the DMR data structure 805. Since data request D1 has not been completed yet and is still the first request in the DMR data structure 805, the request field ("last_complt_request") is still equal to 0.

In the example of FIG. 9E, another related group comprising sets/requests D5, D6, and M3 are received. The data sets/requests D5 and D6 are stored to the DMR data structure and are sent to the remote node for storage. The metadata set/request M3 is stored to the MR data structure 807 and not sent to the remote node yet. The request field ("last_complt_request") is still equal to 0.

In the example of FIG. 9E, the three conditions for coalescing the M2 and M3 metadata requests are found to exist: 1) both M2 and M3 are to be stored to the same storage address location at the remote non-volatile storage device 230 at the remote node; 2) both M2 and M3 have the same data size; 3) the previous metadata request M2 has not yet been transmitted to the remote node. Since M2 is already a part of a metadata chain 1, M3 is added to the metadata chain 1 of M2. The mirroring layer may do so by updating the chain tail pointer to now store the address location of metadata request M3 in the MR data structure, whereby M3 now comprises the tail metadata request of the metadata chain 1.

In the example of FIG. 9F, another related group comprising sets/requests D7, D8, and M4 are received and processed similar to the sets/requests D5, D6, and M3 in the example of FIG. 9E. As such, M4 now comprises the tail metadata request of the metadata chain 1.

In the example of FIG. 9G, data requests D1 and D3 have been completed, whereby request-completion acknowledgements for data requests D1 and D3 have been received from the remote node. The completed data requests D1 and D3 are then removed from the DMR data structure 805. Since metadata request M1 having request identifier 3 is now the first request in the DMR data structure 805, the request field ("last_complt_request") is set to equal 3−1=2.

In the example of FIG. 9G, the mirroring layer then determines the best-send metadata request by first examining the first request in the DMR data structure 805 which is metadata request M1 having request identifier 3. Since M1 is part of a metadata chain 1, the best-send metadata request is set to equal M1. The next request in the DMR data structure is examined, which is a data request D4. As such, M1 is selected as the best-send metadata request comprising the best metadata request to currently send to the remote node. However, since M1 is not the tail metadata request of the metadata chain 1, the metadata chain 1 is broken to produce metadata chain 1 and metadata chain 2. Metadata chain 2 comprises M2 as the head metadata request and M4 as the tail metadata request. Note that metadata chain 1 now comprises M1 as the head and tail metadata request. As such, M1 is now a tail metadata request of metadata chain 1 and is sent to the remote node for storage.

In the example of FIG. 9H, data requests D4, D5, and D6 have been completed, whereby request-completion acknowledgements for data requests D4, D5, and D6 have been received from the remote node. The completed data requests D4, D5, and D6 are then removed from the DMR data structure 805. Since metadata request M2 having request identifier 6 is now the first request in the DMR data structure 805, the request field ("last_complt_request") is set to equal 6−1=5.

Also in the example of FIG. 9H, metadata request M1 is then completed as well, whereby a request-completion acknowledgement for metadata request M1 has been received from the remote node. The completed metadata request M1 is then removed from the DMR data structure 805 and the MR data structure 807. The mirroring layer then determines the best-send metadata request by first examining the first request in the DMR data structure 805 which is metadata request M2 having request identifier 6. Since M2 is part of a metadata chain 2, the best-send metadata request is set to equal M2. The next request in the DMR data structure is examined, which is a metadata request M3. Since M3 is part of a metadata chain 2, the best-send metadata request is set to equal M3. The next request in the DMR data structure is examined, which is a data request D7. As such, M3 is selected and returned as the best-send metadata request. However, since M3 is not the tail metadata request of the metadata chain 2, the metadata chain 2 is broken to produce metadata chain 2 and metadata chain 3. Metadata chain 3 comprises M2 as the head metadata request and M3 as the tail metadata request. Metadata chain 3 comprises M4 as the head and tail metadata request. As such, M3 is now a tail metadata request of metadata chain 2 and is sent to the remote node for storage.

In the example of FIG. 9I, requests D7, D8, and M3 have been completed, whereby request-completion acknowledgements for requests D7, D8, and M3 have been received from the remote node. The completed data requests D7 and D8 are then removed from the DMR data structure 805. The completed metadata request M3 is removed from the DMR data structure 805 and the MR data structure 807. Since metadata request M4 having request identifier 12 is now the first request in the DMR data structure 805, the request field ("last_complt_request") is set to equal 12−1=11. Since completed metadata request M3 is part of metadata chain 2, all metadata requests of metadata chain 2 are removed from the DMR data structure 805 and the MR data structure 807. As such, metadata request M2 is removed from the DMR and MR data structures without ever being transmitted to the remote node, thus reducing network congestion.

As shown above in FIGS. 9H and 9I, for metadata chain 2, only the representative metadata request M3 in the chain is sent to the remote node, and the represented metadata request M2 is not sent to the remote node. Note that this occurred when the metadata requests M2 and M3 in the chain comprised the top requests currently stored in the DMR data structure and the representative metadata request M3 comprises the tail metadata request in the chain. As such, the representative metadata request M3 is the last received metadata request in the chain and may encompass or encapsulate data contained in the represented metadata request M2.

D. Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system for storing data and metadata from a local node to a remote node, the system comprising:
the local node comprising a mirroring engine configured for:
receiving a plurality of data and metadata sets from a mirroring client, each received data or metadata set comprising a data or metadata request from the mirroring client to store the data or metadata set to the remote node;
transmitting each data request to the remote node for storage;
coalescing at least two received metadata requests into a metadata chain comprising a grouping of at least two metadata requests;
storing each received data and metadata request to a data and metadata request (DMR) data structure according to a time order the requests are received;
removing requests from the DMR data structure as the requests are successfully stored to the remote node;
storing each received metadata request to a metadata request (MR) data structure according to the time order the requests are received, the MR data structure for managing metadata chains, each metadata chain comprising a head metadata request comprising the earliest received metadata request in the metadata chain and a tail metadata request comprising the last received metadata request in the metadata chain; and
transmitting only one representative metadata request in the metadata chain to the remote node for storage and not transmitting the other metadata requests in the metadata chain to the remote node if the metadata requests in the metadata chain comprises the earliest received requests remaining in the DMR data structure and the representative metadata request comprises a tail metadata request in the metadata chain, wherein:

the remote node is a predetermined failover partner node of the local node for resuming functions of the local node upon failure of the local node; and the plurality of data and metadata requests from the mirroring client is stored to a local non-volatile storage device on the local node and stored to a remote non-volatile storage device on the remote node for failover protection.

2. The system of claim 1, wherein:

the metadata sets specify a total accumulated number of data sets produced by the mirroring client and sent to the mirroring engine; and the data contained in the representative metadata request encompasses the data contained in the other metadata sets of the metadata chain.

3. The system of claim 1, wherein:

a new received metadata request is coalesced with a previous received metadata request if both metadata requests are to be stored to a same storage address location at the remote node;

both metadata requests have the same data size; and the previous metadata request has not yet been transmitted to the remote node.

4. A method for storing data and metadata from a local node to a remote node, the method comprising:

providing the local node comprising a mirroring engine configured for:

receiving a plurality of data and metadata sets from a mirroring client, each received data or metadata set comprising a data or metadata request from the mirroring client to store the data or metadata set to the remote node;

transmitting each data request to the remote node for storage;

coalescing at least two received metadata requests into a metadata chain comprising a grouping of at least two metadata requests;

storing each received data and metadata request to a data and metadata request (DMR) data structure according to a time order the requests are received;

removing requests from the DMR data structure as the requests are successfully stored to the remote node;

storing each received metadata request to a metadata request (MR) data structure according to the time order the requests are received, the MR data structure for managing metadata chains, each metadata chain comprising a head metadata request comprising the earliest received metadata request in the metadata chain and a tail metadata request comprising the last received metadata request in the metadata chain; and transmitting only one representative metadata request in the metadata chain to the remote node for storage and not transmitting the other metadata requests in the metadata chain to the remote node if the metadata requests in the metadata chain comprises the earliest received requests remaining in the DMR data structure and the representative metadata request comprises a tail metadata request in the metadata chain, wherein:

the remote node is a predetermined failover partner node of the local node for resuming functions of the local node upon failure of the local node; and the plurality of data and metadata requests from the mirroring client is stored to a local non-volatile storage device on the local node and stored to a remote non-volatile storage device on the remote node for failover protection.

5. The method of claim 4, wherein:

the metadata sets specify a total accumulated number of data sets produced by the mirroring client and sent to the mirroring engine; and the data contained in the representative metadata request encompasses the data contained in the other metadata sets of the metadata chain.

6. The method of claim 4, wherein:

a new received metadata request is coalesced with a previous received metadata request if both metadata requests are to be stored to a same storage address location at the remote node;

both metadata requests have the same data size; and the previous metadata request has not yet been transmitted to the remote node.

7. A system for storing data and metadata from a local node to a remote node, the system comprising:

the local node comprising a mirroring engine configured for:

receiving a plurality of data and metadata sets from a mirroring client, each received data or metadata set comprising a data or metadata request from the mirroring client to store the data or metadata set to the remote node;

transmitting each data request to the remote node for storage;

coalescing a first metadata request and a second metadata request to produce a metadata chain if both metadata requests are to be stored to a same storage address location at the remote node, the second metadata request being received after the first metadata request;

storing each received data and metadata request to a data and metadata request (DMR) data structure according to the time order the requests are received;

removing requests from the DMR data structure as the requests are successfully stored to the remote node;

storing each received metadata request to a metadata request (MR) data structure according to the time order the requests are received, the MR data structure for managing metadata chains, each metadata chain comprising a head metadata request comprising the earliest received metadata request in the metadata chain and a tail metadata request comprising the last received metadata request in the metadata chain; and transmitting only one representative metadata request in the metadata chain to the remote node for storage and not transmitting the other metadata requests in the metadata chain to the remote node if the metadata requests in the metadata chain comprises the earliest received requests remaining in the DMR data structure and the representative metadata request comprises a tail metadata request in the metadata chain, wherein:

the remote node is a predetermined failover partner node of the local node for resuming functions of the local node upon failure of the local node; and the plurality of data and metadata requests from the mirroring client is stored to a local non-volatile storage device on the local node and stored to a remote non-volatile storage device on the remote node for failover protection.

8. The system of claim 7, wherein:
the metadata sets specify a total accumulated number of data sets produced by the mirroring client and sent to the mirroring engine; and
the data contained in the second metadata request encompasses the data contained in the first metadata set.

9. A method for storing data and metadata from a local node to a remote node, the method comprising:
providing the local node comprising a mirroring engine configured for:
receiving a plurality of data and metadata sets from a mirroring client, each received data or metadata set comprising a data or metadata request from the mirroring client to store the data or metadata set to the remote node;
transmitting each data request to the remote node for storage;
coalescing a first metadata request and a second metadata request to produce a metadata chain if both metadata requests are to be stored to a same storage address location at the remote node, the second metadata request being received after the first metadata request;
storing each received data and metadata request to a data and metadata request (DMR) data structure according to the time order the requests are received;
removing requests from the DMR data structure as the requests are successfully stored to the remote node;
storing each received metadata request to a metadata request (MR) data structure according to the time order the requests are received, the MR data structure for managing metadata chains, each metadata chain comprising a head metadata request comprising the earliest received metadata request in the metadata chain and a tail metadata request comprising the last received metadata request in the metadata chain; and
transmitting only one representative metadata request in the metadata chain to the remote node for storage and not transmitting the other metadata requests in the metadata chain to the remote node if the metadata requests in the metadata chain comprises the earliest received requests remaining in the DMR data structure and the representative metadata request comprises a tail metadata request in the metadata chain, wherein:
the remote node is a predetermined failover partner node of the local node for resuming functions of the local node upon failure of the local node; and
the plurality of data and metadata requests from the mirroring client is stored to a local non-volatile storage device on the local node and stored to a remote non-volatile storage device on the remote node for failover protection.

10. The method of claim 9, wherein:
the metadata sets specify a total accumulated number of data sets produced by the mirroring client and sent to the mirroring engine; and
the data contained in the second metadata request encompasses the data contained in the first metadata set.

* * * * *